(12) United States Patent
Caprara et al.

(10) Patent No.: US 11,821,620 B2
(45) Date of Patent: Nov. 21, 2023

(54) LIGHT EMITTING DEVICE WITH ADAPTABLE GLARE CLASS

(71) Applicant: Schreder S.A., Brussels (BE)

(72) Inventors: Roxane Caprara, Liège (BE); Paul Smets, Liège (BE); Benoît Kerff, Liège (BE); Maxime Dietens, Liège (BE)

(73) Assignee: Schreder S.A., Brussels (BE)

( * ) Notice: Subject to any disclaimer, the term of this patent is extended or adjusted under 35 U.S.C. 154(b) by 0 days.

(21) Appl. No.: 17/906,202

(22) PCT Filed: Mar. 19, 2021

(86) PCT No.: PCT/EP2021/057135
§ 371 (c)(1),
(2) Date: Sep. 13, 2022

(87) PCT Pub. No.: WO2021/186058
PCT Pub. Date: Sep. 23, 2021

(65) Prior Publication Data
US 2023/0117836 A1  Apr. 20, 2023

(30) Foreign Application Priority Data
Mar. 19, 2020 (NL) ........................... 2025166
Mar. 19, 2020 (NL) ........................... 2025168

(51) Int. Cl.
*F21V 7/00* (2006.01)
*F21V 5/00* (2018.01)
(Continued)

(52) U.S. Cl.
CPC ............ *F21V 7/0083* (2013.01); *F21V 5/007* (2013.01); *F21V 5/008* (2013.01); *F21V 11/02* (2013.01);
(Continued)

(58) Field of Classification Search
CPC ........ F21V 7/0083; F21V 5/007; F21V 5/008; F21V 11/02; F21Y 2105/16; F21Y 2115/10
See application file for complete search history.

(56) References Cited

U.S. PATENT DOCUMENTS

| 2,904,673 | A | 9/1959 | Guth, Sr. | |
|---|---|---|---|---|
| 7,387,409 | B1* | 6/2008 | Beadle | F21S 8/081 362/153.1 |

(Continued)

FOREIGN PATENT DOCUMENTS

| DE | 102015216111 A1 | 3/2017 |
|---|---|---|
| EP | 2924345 A1 | 9/2015 |

(Continued)

OTHER PUBLICATIONS

PCT International Search Report and Written Opinion, Application No. PCT/EP2021/057135, dated May 4, 2021, 14 pages.

*Primary Examiner* — Evan P Dzierzynski
(74) *Attorney, Agent, or Firm* — McDonnell Boehnen Hulbert & Berghoff LLP

(57) ABSTRACT

Example embodiments relate to light emitting devices with adaptable glare classes. One embodiment includes a light emitting device. The light emitting device includes a carrier. The light emitting device also includes a plurality of light sources disposed on the carrier. Additionally, the light emitting device includes a plurality of lenses disposed on the carrier and covering the plurality of light sources. Each lens of the plurality of lenses includes a lens portion and a base portion surrounding the lens portion. Further, the light emitting device includes a light shielding structure that includes a plurality of reflective barriers. Each reflective barrier has an outer surface and a first reflective inner (Continued)

surface. A light transmitting material extends between the outer surface and the first reflective inner surface.

19 Claims, 17 Drawing Sheets

(51) Int. Cl.
*F21V 11/02* (2006.01)
*F21Y 105/16* (2016.01)
*F21Y 115/10* (2016.01)

(52) U.S. Cl.
CPC ....... *F21Y 2105/16* (2016.08); *F21Y 2115/10* (2016.08)

(56) References Cited

U.S. PATENT DOCUMENTS

| | | | |
|---|---|---|---|
| 10,591,134 B2* | 3/2020 | Dong | F21K 9/68 |
| 2011/0292658 A1 | 12/2011 | Ho | |
| 2014/0063802 A1 | 3/2014 | Garcia | |
| 2014/0119029 A1* | 5/2014 | Hsieh | F21V 13/04 |
| | | | 362/308 |
| 2015/0138769 A1* | 5/2015 | Chen | F21K 9/00 |
| | | | 362/240 |
| 2016/0327236 A1* | 11/2016 | Benitez | F21V 23/0457 |
| 2017/0191642 A1* | 7/2017 | Xu | F21V 23/02 |

FOREIGN PATENT DOCUMENTS

| | | |
|---|---|---|
| EP | 3211297 A1 | 8/2017 |
| GB | 531868 A | 1/1941 |
| WO | 2015103522 A1 | 7/2015 |

\* cited by examiner

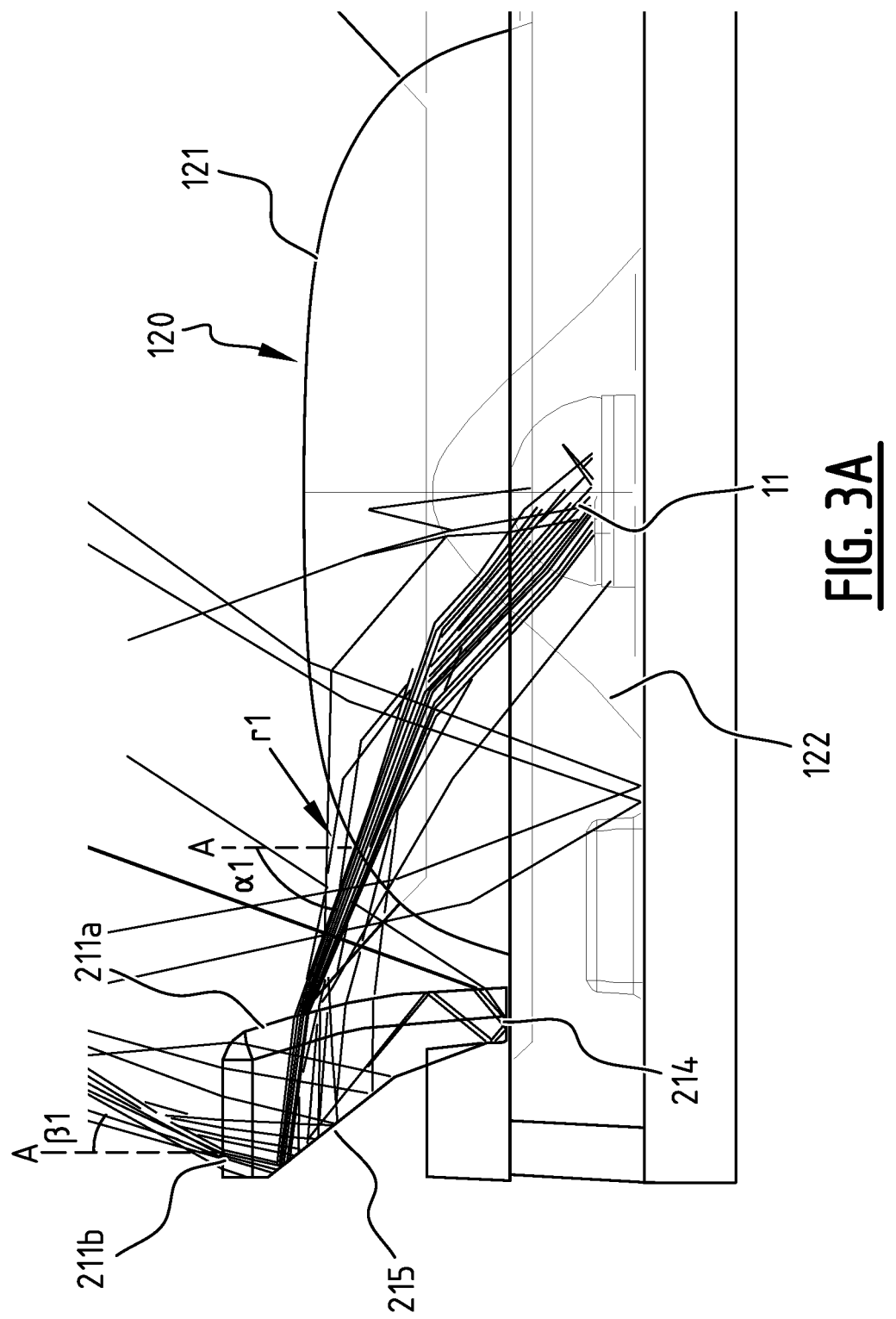

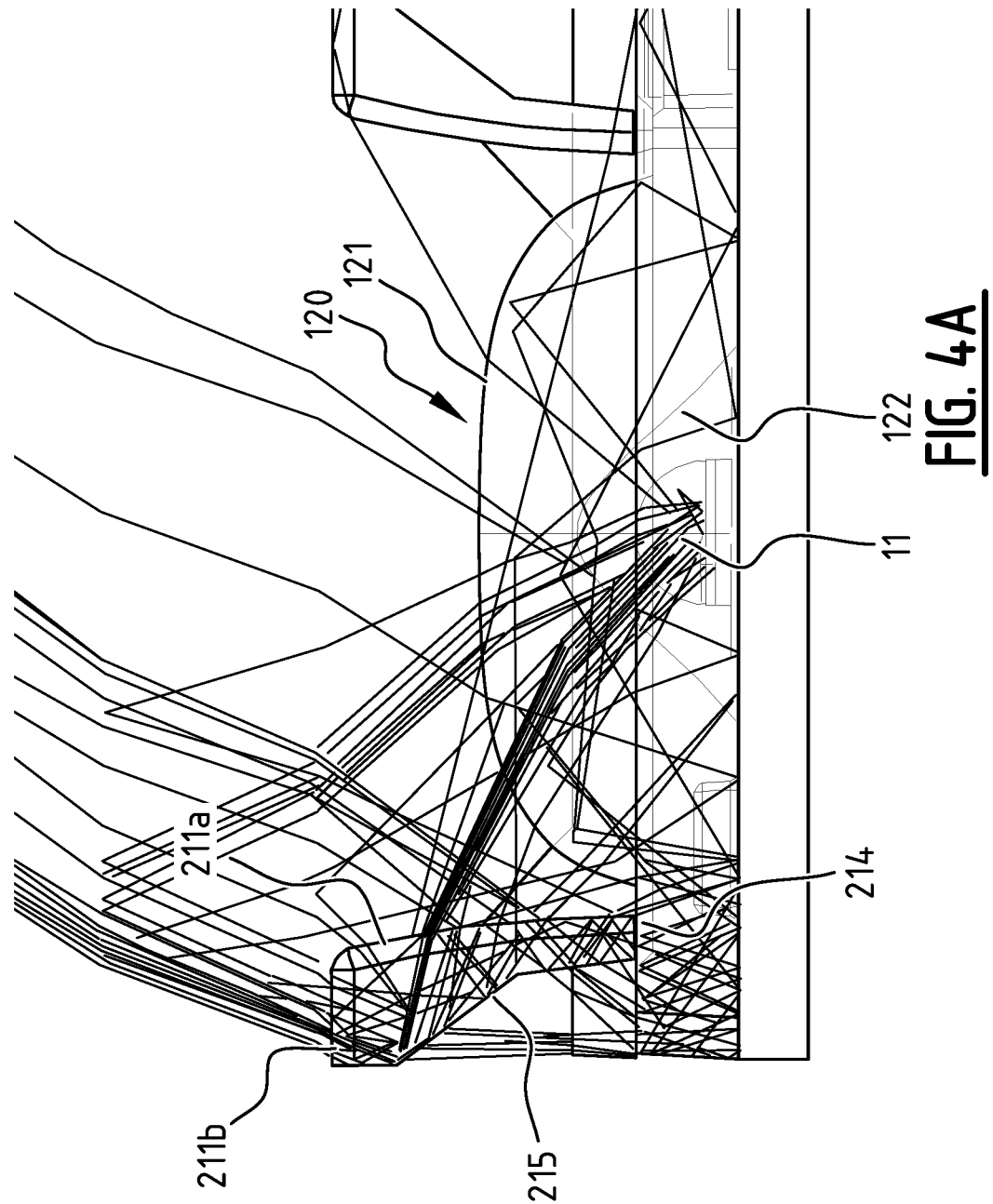

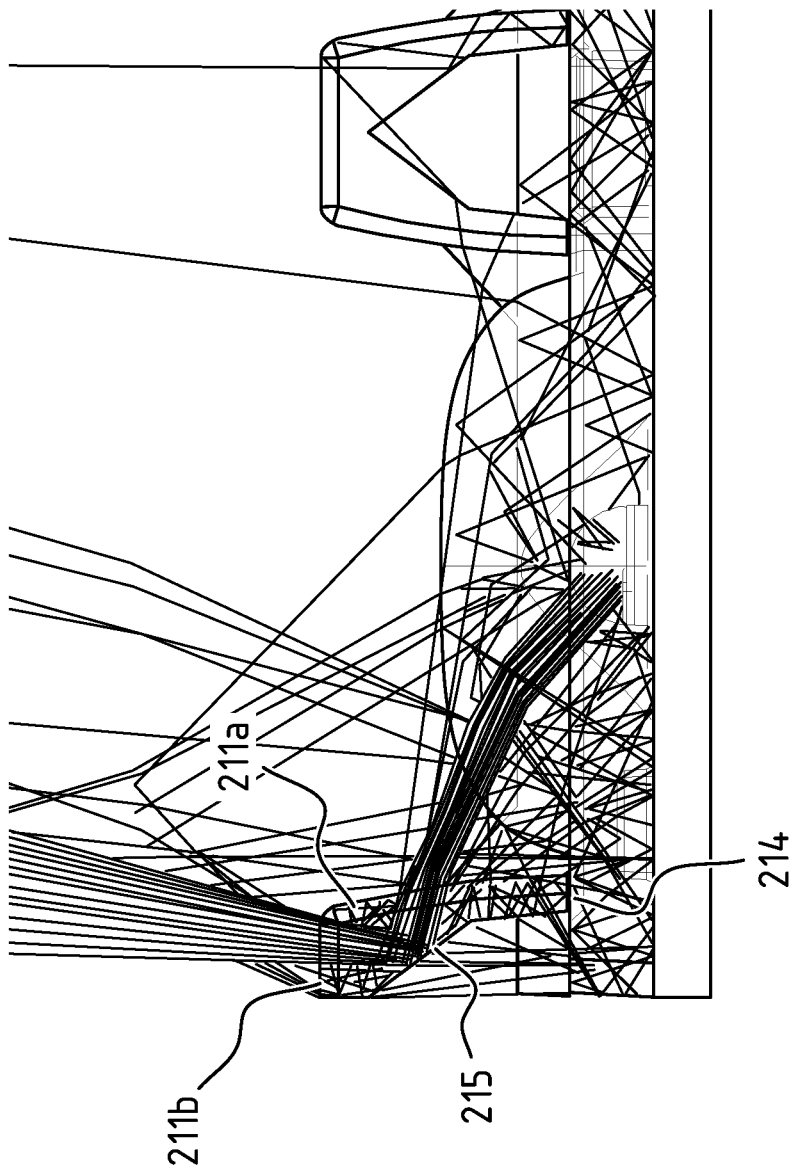

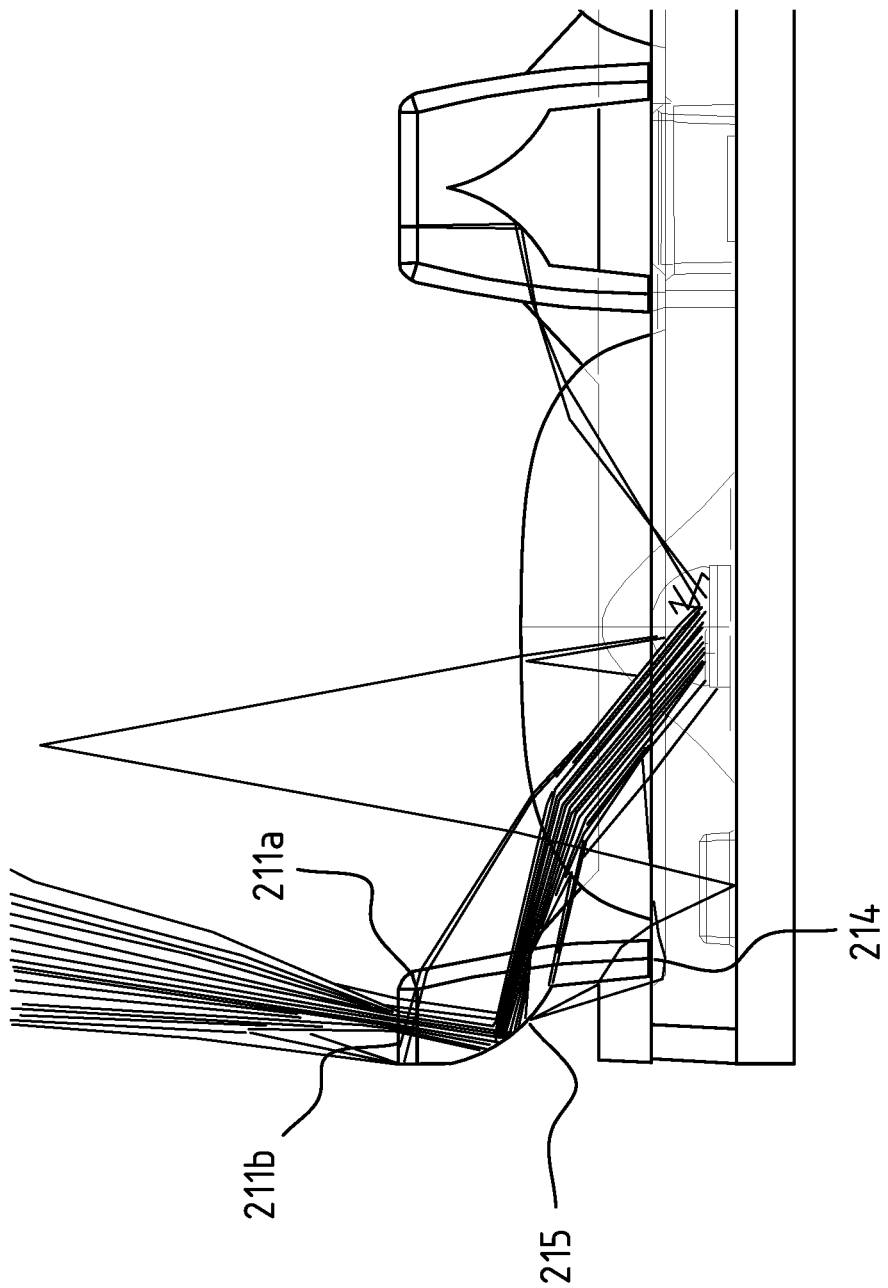

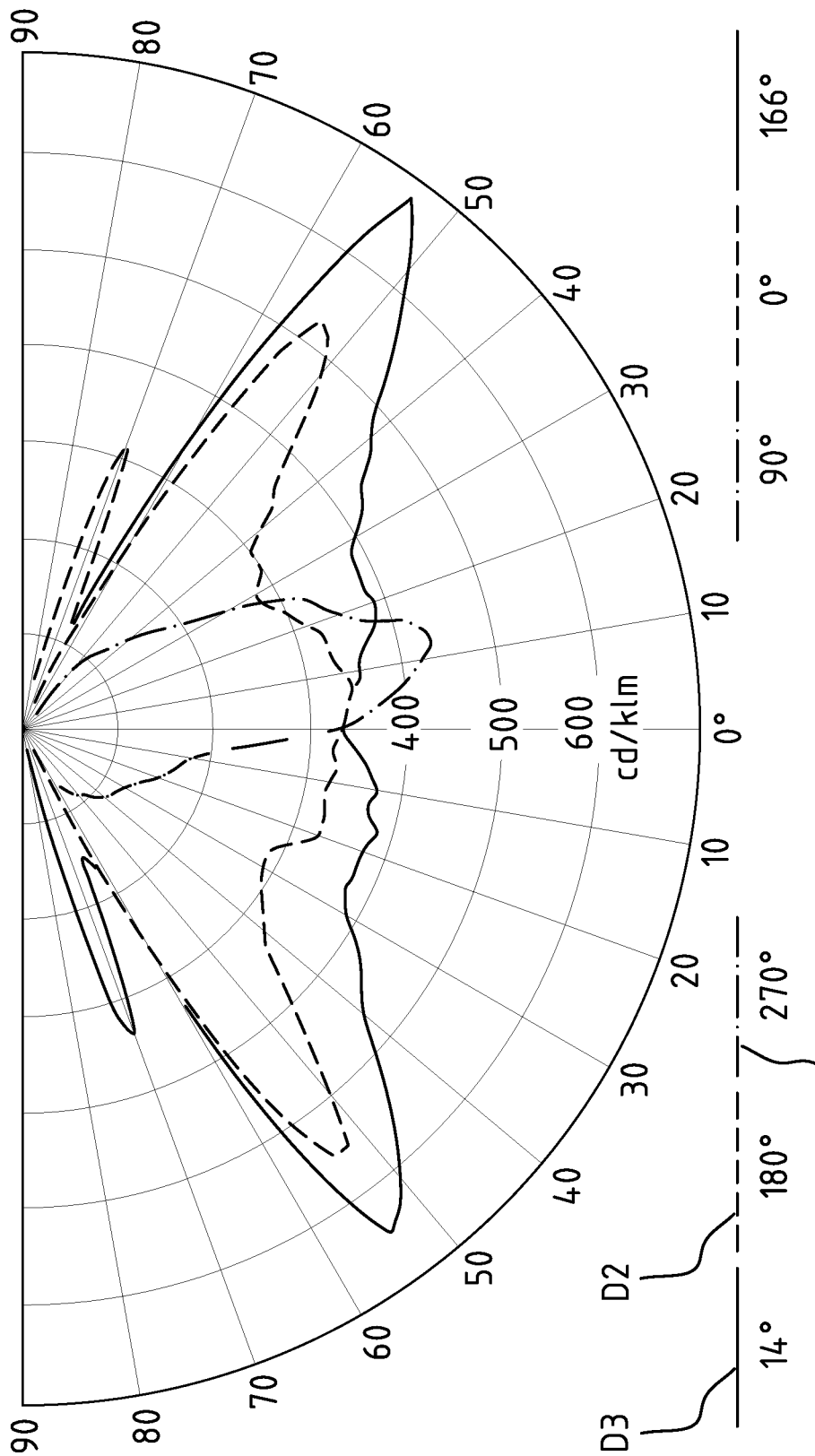

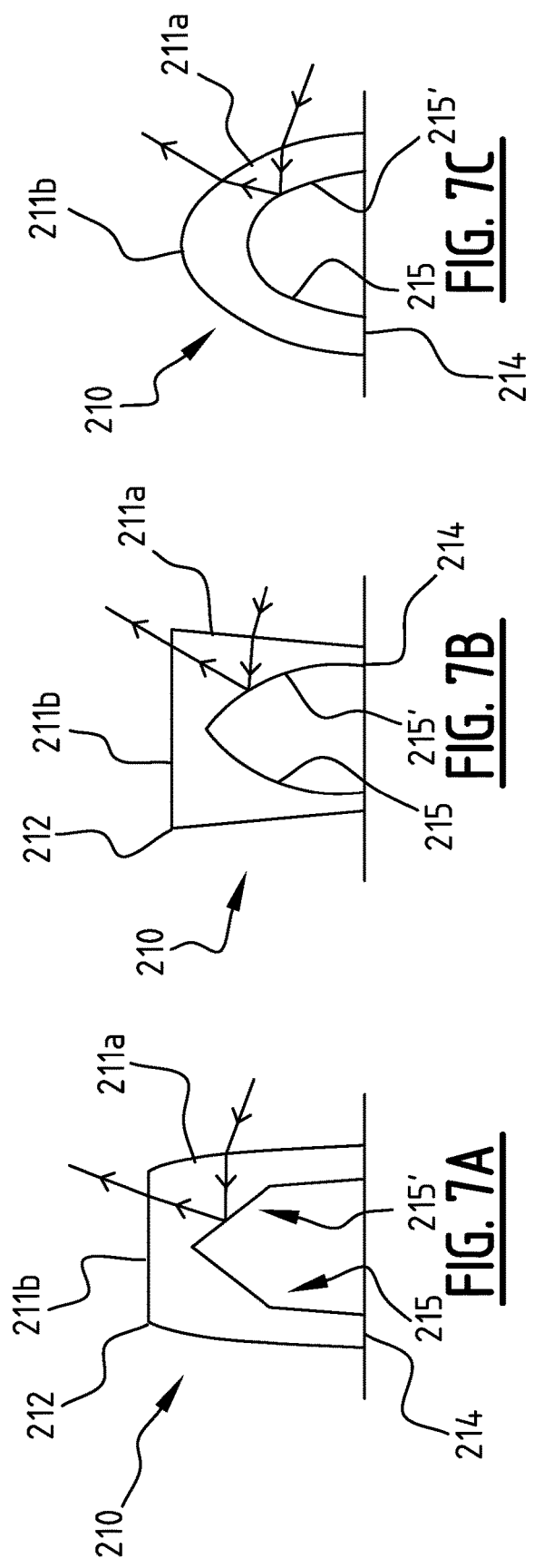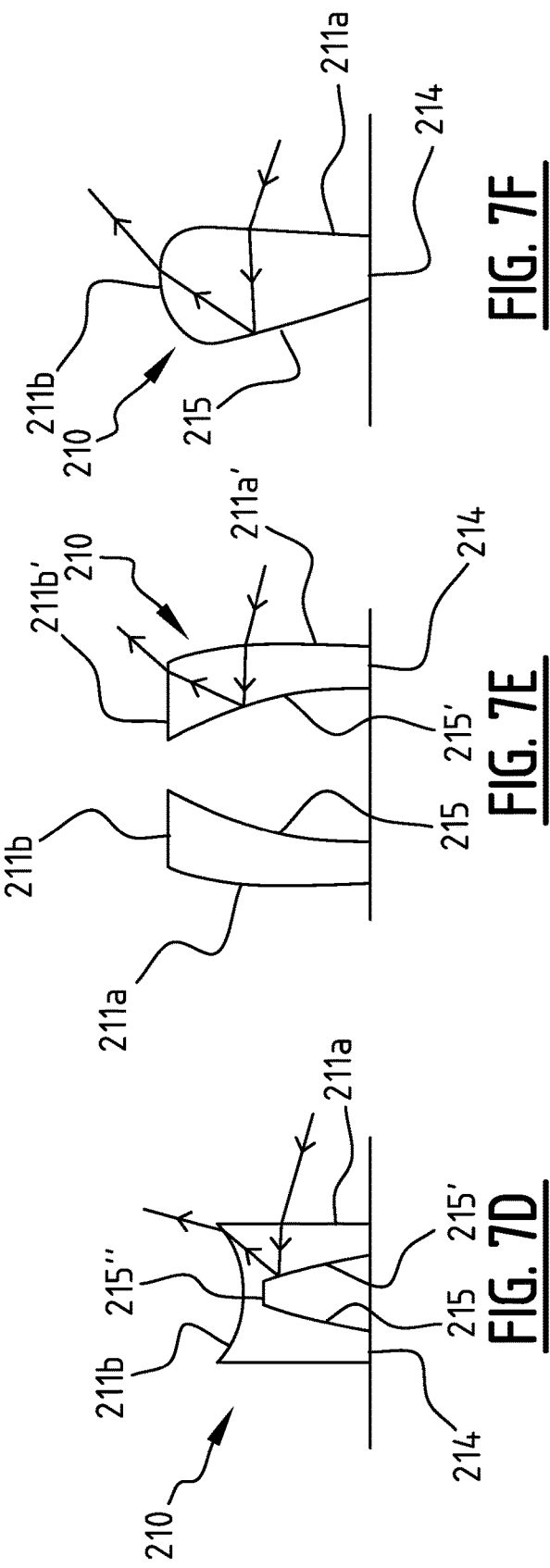

LIGHT EMITTING DEVICE WITH ADAPTABLE GLARE CLASS

CROSS-REFERENCE TO RELATED APPLICATIONS

The present application is a national stage entry of PCT/EP2021/057135 filed Mar. 19, 2021, which claims priority to NL 2025166 filed Mar. 19, 2020 and NL 2025168 filed Mar. 19, 2020, the contents of each of which are hereby incorporated by reference.

FIELD OF INVENTION

The present invention relates to a light emitting device, and more particularly, to a light emitting device with an improved G/G* classification.

BACKGROUND

Optical elements, such as light emitting diodes (LEDs) and lenses, comprised in standard light emitting devices may emit light at large angles. In the designs of conventional light emitting devices, such as LED devices, the light rays generated by the light source may have large angles below the horizontal, and thus may result in glare that would cause discomfort for the user.

Therefore, light emitting devices, in particular outdoor luminaires, must comply with different glare classifications, usually abbreviated G or G* classifications. The G classification is defined in the CIE115:2010 standard, whereas the G* classification is defined by the EN 13201-2 standard. Such classifications are based on the maximal allowed ratio between the light intensity and the light flux at large angles below the horizontal, such ratio being generally expressed in cd/klm. The lowest G/G* classification, or G1/G*1 class, corresponds to the glariest situation for the user, causing the highest discomfort, whereas the highest G/G* classification, or G6/G*6 class, corresponds to the most comfortable situation for the user.

In order to reduce light intensities at large angles and improve the G/G* classification of a light emitting device, improved optical elements can be developed and manufactured. While the above mentioned goal can be achieved, manufacturing such optical elements can be time consuming and expensive, requiring large investment costs for replacing the existing optical elements on the light emitting devices. Moreover, in order to adapt the G/G* classification of a light emitting device, different types of optical elements are required, each given type corresponding to a given G/G* classification. Finally, for each type of optical elements corresponding to each G/G* classification, additional categories of optical elements may be required depending on the road type, e.g. depending on the width of a road (residential road, traffic route, highway, pedestrian path, etc.), or depending on its location (inside a city, in the countryside, etc.). This has the effect of increasing the amount of different optical elements to be manufactured in order to answer every need from the customers. This solution may involve high development, manufacturing, and maintenance costs.

SUMMARY

The object of embodiments of the invention is to provide a light emitting device comprising a light shielding structure. More in particular, embodiments of the invention aim at providing a light emitting device comprising a light shielding structure configured for cutting off or redirecting light rays having a large incident angle, thereby reducing the light intensities at large angles and improving the G/G* classification of the light emitting device.

According to a first aspect of the invention, there is provided a light emitting device comprising a carrier, a plurality of light sources disposed on the carrier, a plurality of lenses disposed on the carrier, and a light shielding structure. The plurality of lenses cover the plurality of light sources. Each of the plurality of lenses comprises a lens portion and a base portion surrounding said lens portion. The light shielding structure comprises a plurality of reflective barriers, each having an outer surface and a first reflective inner surface. A light transmitting material extends between the outer surface and the first reflective inner surface. The outer surface is oriented such that a portion of the light rays emitted by a first light source of the plurality of light sources is transmitted through a first lens of the plurality of lenses and through a first portion of the outer surface in the direction of the first reflective inner surface. The first reflective inner surface is configured for reflecting the portion of the light rays in the direction of a second portion of the outer surface. In other words, the reflective inner surface is adapted to redirect the light rays propagating within the inner light transmitting material of the reflective barrier. The second portion of the outer surface is located further away from the base portion of the first lens than the first portion.

Embodiments of the invention are based inter alia on the insight that light emitting devices generally incorporate optical elements which are costly, of complex design, and can be the cause of delays in the fabrication line. To overcome the problem of manufacturing different types of optical elements according to different G/G* classifications a light emitting device must comply with, a light emitting device comprising a light shielding structure as defined above can be used, resulting in a cheaper solution whilst being able to achieve a high G/G* classification. Moreover, with the light emitting device as defined above, it is also possible to easily achieve various G/G* classifications with a given optical element, e.g. by varying the number and/or height and/or shape of the reflective barriers.

The light shielding structure may be a separate component mounted on the plurality of lenses, or may be integrally formed with the plurality of lenses, e.g. by overmoulding.

According to a preferred embodiment, the plurality of lenses may be separately formed and an optical structure may comprise a frame carrying the plurality of lenses. In another embodiment, the plurality of lenses may be separately formed and mounted directly on the carrier. In yet another embodiment, the optical structure may comprise a frame and a lens plate integrating the plurality of lenses, wherein the lens plate is carried by the frame. Also, the frame may carry multiple lens plates together integrating the plurality of lenses. In still another embodiment, the optical structure may be the lens plate without a frame. For example, when the lens plate is sufficiently rigid, it may be used without a frame. When the optical structure comprises the lens plate, the plurality of base portions of the corresponding plurality of lenses may correspond to the externally flat portion of the lens plate interconnecting the plurality of lens portions.

The first portion of the outer surface of each reflective barrier comprised in the light shielding structure is configured to refract light rays impinging on the first portion of the outer surface. The impinging light rays are light rays emitted by the first light source and transmitted through the first lens of the plurality of lenses. The material between the outer surface and the first reflective inner surface of each reflective barrier is a light transmitting material, i.e. transparent or translucent. The refracted light rays propagate within the light transmitting material until they reach the first reflective inner surface. The first reflective inner surface is arranged such that it faces the first and the second portions of the outer surface. Thus, when the refracted light rays are reflected on the first reflective inner surface, they are redirected towards the second portion of the outer surface. Since the second portion of the outer surface is located further away from the base portion of the first lens than the first portion, and the first portion of the outer surface is impinged with light rays transmitted through the first lens at large angles, the light shielding structure as defined above enables a reduction of the light intensities at large angles by redirecting these light rays through the second portion of the outer surface; thereby improving the G/G* classification of the light emitting device.

Preferred embodiments relate to a light shielding structure for use in an outdoor luminaire. By outdoor luminaire, it is meant luminaires which are installed on roads, tunnels, industrial plants, campuses, stadiums, airports, harbours, rail stations, parks, cycle paths, pedestrian paths or in pedestrian zones, for example, and which can be used notably for the lighting of an outdoor area such as roads and residential areas in the public domain, private parking areas and access roads to private building infrastructures, etc.

In a preferred embodiment, the outer surface is arranged and configured such that said portion of light rays which is incident on the first portion of the outer surface has an incident angle $\alpha 1$ with respect to an axis A substantially perpendicular to the carrier. The incident angle $\alpha 1$ has a value between a first predetermined angle $\alpha p1$ and 90°. The first predetermined angle $\alpha p1$ is comprised between 60° and 85°, preferably between 70° and 80°.

The above-mentioned axis A may be an axis intersecting said one or more associated first lenses of said plurality of lenses substantially perpendicular to the plurality of base portions of the corresponding plurality of lenses. The axis A may correspond to the optical axis of said one or more associated first lenses. The incident angle $\alpha 1$ with respect to said axis A may be between the first predetermined angle $\alpha p1$ and 90°. The above-mentioned range for the first predetermined angle $\alpha p1$ enables the selection of large incident angles that correspond to glaring angles. Since the second portion of the outer surface is configured such that it is located further away from the base portion of the first lens than the first portion of the outer surface, the light shielding structure enables to avoid that a backward incident light ray having a large incident angle with respect to said axis A is reflected with a reflection angle substantially equal to the incident angle, thereby avoiding that a reflected light ray may have a glaring angle for a user.

In an exemplary embodiment, the outer surface and the first reflective inner surface are arranged and configured such that said portion of light rays emerging from the second portion of the outer surface has an emergent angle $\beta 1$ with respect to an axis A substantially perpendicular to the carrier, said emergent angle $\beta 1$ being smaller than 60°.

The axis A may be substantially perpendicular to the base portion. Since the emergent angle $\beta 1$ is smaller than 60°, the light rays emerging from the second portion of the outer surface are not at a glaring angle for the user.

In a preferred embodiment, the emergent angle $\beta 1$ is comprised between 0° and 50°, preferably between 0° and 45°.

In this manner, the emergent light rays are redirected substantially forward to be more efficiently used for the lighting of a surface facing the plurality of lenses instead of being at a glaring angle.

In an exemplary embodiment, a reflective barrier of said plurality of reflective barriers is made 35 integrally of a transparent material.

In this way, light losses within the light transmitting material are minimized and the emergent angle $\beta 1$ of the light rays may be more easily predicted.

In a preferred embodiment, a first slope angle s1 between a tangent line of the first portion of the outer surface and a plane parallel to the carrier is higher than a second slope angle s2 between a tangent line of the first reflective inner surface and a plane parallel to the carrier.

The light rays transmitted through the first lens of the plurality of lenses first impinge upon the first portion of the outer surface. More particularly, after getting refracted at the air/lens interface of the first lens, the light rays propagate in air until reaching the barrier/air interface of the first portion of the outer surface. Upon impinging on the first portion of the outer surface, the light rays are refracting inside the light transmitting material having a higher refractive index. Since the barrier material has a refractive index higher than the refractive index of air, the refracted light rays are refracted at an angle closer, i.e. more acute, to an axis perpendicular to the first portion of the outer surface. Arriving upon the first reflective inner surface, since the second slope angle s2 of said first reflective inner surface is lower that the first slope angle s1 of the first portion of the outer surface, the reflected light rays are reflected at an angle closer, i.e. more acute, to the axis A than when transmitted through the first lens. In effect, the light rays transmitted through the first lens at large angles are redirected in a direction closer to the optical axis of the first lens thanks to the relationship defined above between the first slope angle s1 and the second slope angle s2.

In an exemplary embodiment, the second portion of the outer surface corresponds with a top surface of the reflective barrier.

In this manner, light rays emerging from the second portion of the outer surface with a non-glaring angle are not interfered with via refraction or reflection on additional surfaces of the reflective barrier.

In a preferred embodiment, the first reflective inner surface comprises any one of a concave surface, a convex surface, a flat surface, or a combination thereof.

In this way, the shape of the first reflective inner surface is not limited to a flat surface. The use of concave and/or convex shapes enables to achieve that the reflection angle on the first reflective inner surface may be smaller than the incident angle from light rays refracted by the first portion of the outer surface, thereby avoiding the above-mentioned undesired effect related to reflected backward incident light ray having a very large angle. Indeed, a flat surface reflects light rays with a reflection angle equal to the incident angle. Using a convex surface and/or a concave surface or a combination of a flat surface, a concave surface, and/or a convex surface would enable a better control on the general direction of reflection for a predetermined range of incident angles of the light rays on the first reflective inner surface.

In an exemplary embodiment, when seen in a plane parallel to the carrier, the first lens of the plurality of lenses has a first dimension in a direction substantially parallel to the plurality of reflective barriers, and a second dimension perpendicular on said first dimension. The second dimension is larger than said first dimension.

In this manner, since the second dimension is larger than the first dimension, the majority of light rays emitted at angles below 60°, preferably below 70° with respect to the axis A are not impinging upon the reflective barrier and only selected light rays at large angles are intercepted by the reflective barrier.

In a preferred embodiment, the first lens of the plurality of lenses has a symmetry plane P1 perpendicular to the carrier, and the plurality of reflective barriers is substantially parallel to said symmetry plane P1.

In other words, the first reflective inner surface faces the first lens of said plurality of lenses, and is facing the symmetry plane P1 of the first lens. In light emitting devices using free-form lenses, such as outdoor luminaires, the plurality of lenses is disposed such that the symmetry plane P1 of said lenses is substantially perpendicular to the motion direction of a road, tunnel, or path, in order to have substantially the same illumination distribution on both motion directions of the road, tunnel, or path. Hence, arranging the first reflective inner surface substantially perpendicularly to the motion direction of e.g. a road enables to cut off or reflect light rays having a large incident angle in the motion direction of said road, thereby improving the comfort of a user.

In an exemplary embodiment, the plurality of lenses comprises free-form lenses. The term "free-form" typically refers to non-rotational symmetric lenses.

In a preferred embodiment, the plurality of lenses is a plurality of non-rotational symmetric lenses comprising the symmetry plane P1 substantially perpendicular to the plurality of base portions of the corresponding plurality of lenses. The symmetry plane P1 may be a single symmetry plane.

In an embodiment, one or more other optical elements may be provided to the plurality of lenses, such as reflectors, backlights, prisms, collimators, diffusors, and the like. For example, there may be associated a backlight element with some lenses or with each lens of the plurality of lenses. Those one or more other optical elements may be formed integrally with the lens or with the optical structure comprising the plurality of lenses, preferably with the lens plate integrating the plurality of lenses. In other embodiments, those one or more other optical elements may be formed integrally with the light shielding structure, and/or mounted on the lens and/or on the optical structure comprising the plurality of lenses and/or on the light shielding structure via releasable fastening elements. In the context of the invention, a lens may include any light transmitting optical element that focuses or disperses light by means of refraction. It may also include any one of the following: a reflective portion, a backlight portion, a prismatic portion, a collimator portion, a diffusor portion. For example, a lens may have a lens portion with a concave or convex surface facing a light source, or more generally a lens portion with a flat or curved surface facing the light source, and optionally a collimator portion integrally formed with said lens portion, said collimator portion being configured for collimating light transmitted through said lens portion. Also, a lens may be provided with a reflective portion or surface, referred to as a backlight element in the context of the invention, or with a diffusive portion.

A lens of the plurality of lenses may comprise a lens portion having an outer surface, and an inner surface facing the associated light source. The outer surface may be a convex surface and the inner surface may be a concave or planar surface. Also, a lens may comprise multiple lens portions adjoined in a discontinuous manner, wherein each lens portion may have a convex outer surface and a concave inner surface.

Hence, lenses that can be used in combination with the light shielding structure are not limited to rotation-symmetric lenses such as hemispherical lenses, or to ellipsoidal lenses having a major symmetry plane and a minor symmetry plane, although such rotation-symmetric lenses could be used. Alternatively, lenses with no symmetry plane or symmetry axis could be envisaged.

In an exemplary embodiment, a reflective barrier of the plurality of reflective barriers further has a second reflective inner surface. A light transmitting material extends between the outer surface and the second reflective inner surface. The outer surface is oriented such that a portion of the light rays emitted by a second light source of the plurality of light sources is transmitted through a second lens of the plurality of lenses and through the first portion of said outer surface in the direction of the second reflective inner surface. The second reflective inner surface is configured for reflecting said portion of the light rays in the direction of the second portion of said outer surface.

In the same way the first portion of the outer surface and the first reflective inner surface of said plurality of reflective barriers are configured for redirecting light rays emitted through the associated first lens of said plurality of lenses, the first portion of the outer surface and the second reflective inner surface of said plurality of reflective barriers are configured for redirecting light rays emitted through the associated second lens of said plurality of lenses. The second lens is arranged adjacent to the first lens. This arrangement implies that the second reflective inner surface is arranged opposite the first reflective inner surface and each of the first and second reflective inner surfaces are associated with oppositely faced first portions of the outer surface. The configuration of the second reflective inner surface and the associated first portion of the outer surface may be, but does not need to be, the same as the one of the first reflecting inner surface and the associated first portion of the outer surface, in order to achieve the same or similar results with respect to cutting off or redirecting light rays having a large incident angle, i.e., in order that the light shielding structure as defined above enables a reduction of the light intensities at large angles by redirecting these light rays through the second portion of the outer surface, thereby improving the G/G* classification of the light emitting device.

In a preferred embodiment, the reflective barrier is symmetric and is arranged between the first and second lenses at an equal distance thereof.

A symmetric arrangement of the first and second reflective inner surfaces and the associated first portions of outer surfaces with respect to the first and second lenses facilitates the design and manufacture of the plurality of reflective barriers. Together with the arrangement of the reflective barrier at equal distance from the first lens and the second lens, this arrangement may enable to achieve the same or similar results with respect to cutting off or redirecting light rays having a large incident angle from both the first lens and the second lens. The two above-mentioned arrangements enable to obtain homogeneous results between the first lens and the second lens.

In other embodiments, the first and second reflective inner surfaces and the associated first portions of outer surfaces of the plurality of reflective barriers may not be symmetric and/or may not be at equal distance from the first lens and the second lens. For example, in an embodiment, the first and second lenses are lenses having different optical properties and the first and second reflective inner surfaces may be adapted to achieve similar results with respect to cutting off or redirecting light rays having a large incident angle despite the differences between the first and second lenses. In another embodiment, the first lens is configured for shaping a light distribution towards a first path for a first type of users and the second lens is configured for shaping a light distribution towards a second path for a second type of users; the first and second reflective inner surfaces may be configured accordingly in order to achieve different G/G* classification appropriate for the different paths and types of users.

In an exemplary embodiment, a height H of the plurality of reflective barriers, measured perpendicular on the carrier, is larger than a height H" of the plurality of lenses, preferably larger than 110% of a height H" of the plurality of lenses.

The height H" of the plurality of lenses corresponds to the distance between a plane including an upper flat surface of the plurality of base portions surrounding the plurality of lenses and the highest point of a lens of the plurality of lenses. Preferably, the distance between two adjacent light sources is smaller than 60 mm, more preferably smaller than 50 mm, most preferably smaller than mm Typically the distance between two adjacent light sources will be larger than 20 mm Preferably, the height H of the plurality of reflective barriers and/or of the at least one further reflective barrier is smaller than 10 mm, more preferably smaller than 8 mm, most preferably smaller than 7 mm, or even smaller than 6 mm. This range of heights enables the plurality of reflective barriers to efficiently cut off or redirect light rays having a large incident angle, thereby enabling to efficiently adapt the G/G* classification of the light emitting device.

In a preferred embodiment, the plurality of lenses is aligned into a plurality of rows R and a plurality of columns C to form a two-dimensional array. The plurality of reflective barriers is disposed between adjacent columns of the plurality of columns.

Similarly, in a preferred embodiment the plurality of reflective barriers is aligned into a plurality of rows or a plurality of columns.

A plurality of lenses, preferably a lens plate integrating the plurality of lenses, comprising a two-dimensional array formed by rows R and columns C of lenses is typically found in light emitting devices such as outdoor luminaires.

In an exemplary embodiment, the plurality of columns C extends substantially parallel to a symmetry plane P1 of a lens of the plurality of lenses.

This embodiment is in accordance with an embodiment wherein the first portion of the outer surface of the plurality of reflective barriers is substantially parallel to the symmetry plane of the plurality of lenses. The plurality of lenses is aligned into a plurality of columns C along their symmetry plane P1.

In an exemplary embodiment, also an edge of a base surface of the plurality of reflective barriers is substantially parallel to said symmetry plane P1.

In a preferred embodiment, the outer surface is facing the associated first lens of the plurality of lenses belonging to a first column of said plurality of columns C. The associated second lens of the plurality of lenses belongs to a second column which is adjacent to said first column.

In an exemplary embodiment, the light shielding structure further comprises a connecting means configured for connecting the plurality of reflective barriers.

In this manner, by connecting the plurality of reflective barriers the connecting means offers more rigidity to the light shielding structure. Moreover, the connecting means facilitates the mounting of the light shielding structure on the plurality of lenses and/or on the optical structure comprising the plurality of lenses and/or on the carrier.

In a preferred embodiment, the connecting means is disposed between adjacent rows of said plurality of rows R.

This embodiment is in accordance with an embodiment wherein at least one reflective barrier of the plurality of reflective barriers is disposed between two adjacent columns of said plurality of columns C, thereby creating another two-dimensional array that cooperates with the two-dimensional array formed by the plurality of rows R and columns C of lenses.

In an exemplary embodiment, the connecting means comprises one or more notches or channels into which the plurality of reflective barriers is received.

In a preferred embodiment, the plurality of reflective barriers and the connecting means are integrally formed.

In this way, the design and the manufacture of the light shielding structure are facilitated, especially when the light shielding structure is molded. The rigidity and mechanical resistance of the entire structure are also improved. Moreover, the mounting of the light shielding structure on plurality of lenses and/or on the the optical structure comprising the plurality of lenses and/or carrier is facilitated.

In an exemplary embodiment, in an area between adjacent lenses, a height H of the plurality of reflective barriers is substantially larger than a height H' of the connecting means.

In a preferred embodiment, the light shielding structure is made as an integral part of the plurality of lenses, preferably as an integral part of the optical structure integrating the plurality of lenses such as a lens plate.

In an exemplary embodiment, the light shielding structure is mounted on the plurality of lenses and/or on the optical structure comprising the plurality of lenses and/or on the carrier by means of releasable fastening elements.

In yet another exemplary embodiment, the releasable fastening elements comprise any one or more than the following elements: screws, locks, clamps, clips, or a combination thereof.

Screwing, locking, clamping, clipping, and the like correspond to releasable fastening means, thereby enabling the maintenance or the replacement of the plurality of lenses, and/or of the carrier, and/or the light shielding structure.

It is noted that the same fastening means may fasten the light shielding structure to the optical structure comprising the plurality of lenses and the optical structure comprising the plurality of lenses to the carrier, e.g. a screw passing through the light shielding structure and through the optical structure comprising the plurality of lenses, preferably through the lens plate integrating the plurality of lenses, and being screwed in the carrier.

In a preferred embodiment, the releasable fastening elements are located at intersections I of the plurality of reflective barriers with the connecting means.

In this manner, the rigidity and the respective functionalities of both the reflective barriers and the connecting means are not altered significantly by the presence of the releasable fastening elements.

In an exemplary embodiment, the plurality of lenses, preferably the optical structure integrating the plurality of lenses such as a lens plate, is disposed on the carrier by screwing, locking, clamping, clipping, gluing, or a combination thereof.

In an exemplary embodiment, the connecting means is provided with holes, and the releasable fastening elements are located into said holes. Optionally, the optical structure comprising the plurality of lenses, preferably the lens plate integrating the plurality of lenses, is provided with holes for fixation to the carrier. The carrier may comprise a printed circuit board (PCB).

In a preferred embodiment, the plurality of light sources is a plurality of light emitting diodes (LED). It is noted that a light source may consist of one or more light emitting diodes, and that one or more light emitting diodes may be arranged below the same lense.

LEDs have numerous advantages such as long service life, small volume, high shock resistance, low heat output, and low power consumption.

In an exemplary embodiment, the light shielding structure comprises at least one further reflective barrier arranged at an angle with respect to the plurality of reflective barriers.

Preferably, the at least one further reflective barrier is arranged substantially parallel to the axis A. Preferably, the at least one further reflective barrier is arranged substantially perpendicular to the plurality of reflective barriers.

The at least one further reflective barrier and the connecting means may be integrally formed. Additionally or alternatively, the plurality of lenses and the connecting means may be integrally formed.

In an exemplary embodiment, the at least one further reflective barrier is disposed between two adjacent rows of lenses.

In an exemplary embodiment, the at least one further reflective barrier is disposed between two adjacent rows R.

In a preferred embodiment, the connecting means comprises at least one elongated carrier slat, said at least one elongated carrier slat comprising an elongated channel configured for receiving a reflective barrier of the at least one further reflective barrier.

Alternatively, the connecting means may comprise one or more notches or channels into which the at least one further reflective barrier is received, and the connecting means may comprise at least one elongated carrier slat, said at least one elongated carrier slat comprising an elongated channel configured for receiving a reflective barrier of the plurality of reflective barriers.

In this way, the plurality of reflective barriers and/or the at least one further reflective barrier may be slid in a portion of the light shielding structure. To that end, the base surface of the plurality of reflective barriers and/or of the at least one further reflective barrier may be provided with one or more protrusions, e.g. one or more pins and/or ribs, which fit in the one or more notches or channels and/or in the at least one elongated carrier slat. Alternatively, one or more protrusions, such as pins or ribs, may be provided to the connecting means, said one or more protrusions being configured for cooperating with complementary features of the plurality of reflective barriers and/or of the at least one further reflective barrier, in order to secure the plurality of reflective barriers and/or the at least one further reflective barrier to the connecting means.

In a possible embodiment, one or more recesses, such as one or more holes and/or channels, may be arranged in an optical structure comprising the plurality of lenses, preferably the lens plate, or in the carrier, into which the light shielding structure may be clipped or slid. To that end, the base surface of the light shielding structure may be provided with one or more protrusions, e.g. one or more pins and/or ribs, which fit in the one or more recesses. In addition or alternatively, one or more protrusions, such as pins or ribs, may be provided to the optical structure comprising the plurality of lenses or to the carrier, said one or more protrusions being configured for cooperating with complementary features of the light shielding structure in order to secure the light shielding structure to the optical structure comprising the plurality of lenses or to the carrier respectively.

In another exemplary embodiment, one or more recesses, such as one or more holes and/or notches, may be arranged in the light shielding structure, into which the plurality of reflective barriers and/or the at least one further reflective barrier may be clipped. To that end, the base surface of the plurality of reflective barriers and/or of the at least one further reflective barrier may be provided with one or more protrusions, e.g. one or more pins and/or ribs, which fit in the one or more recesses. For example, the one or more notches may have a V-shape or a U-shape, and the one or more protrusions may have a triangular or a circular shape which respectively fits in the V-shape or in the U-shape of the one or more notches. The one or more recesses may be provided to the connecting means or to the optical structure comprising the plurality of lenses, preferably the lens plate. In addition or alternatively, one or more protrusions, such as pins or ribs, may be provided to the connecting means or to the optical structure comprising the plurality of lenses, said one or more protrusions being configured for cooperating with complementary features of the plurality of reflective barriers and/or of the at least one further reflective barrier in order to secure the plurality of reflective barriers to the connecting means.

In an embodiment, the reflective barriers facing associated lenses located in a central portion of the plurality of lenses are substantially higher than the reflective barriers facing associated lenses located in a peripheral portion of the plurality of lenses. Alternatively, said reflective barriers facing said associated lenses located in said central portion of the plurality of lenses may be substantially lower than reflective barriers facing said associated lenses located in said peripheral portion of the plurality of lenses.

In the embodiment where the reflective barriers facing associated lenses located in a central portion of the plurality of lenses are substantially higher (lower) than the reflective barriers facing associated lenses located in a peripheral portion of the plurality of lenses, said reflective barriers facing said associated lenses located in said central portion of the plurality of lenses may be disposed between two adjacent central columns of lenses, and said reflective barriers facing said associated lenses located in said peripheral portion of the plurality of lenses may be disposed between two adjacent peripheral columns of lenses.

A further reduction of the light intensities at large angles can be realized by providing additional reflective barriers to the plurality of lenses. Alternatively, it is possible to vary the height of one or more reflective barriers, or to vary the number and/or the height and/or the shape of the reflective barriers in order to adapt the light intensities of the light emitting device at large angles.

The skilled person will understand that the hereinabove described technical considerations and advantages for light emitting device embodiments also apply to the below described corresponding light shielding structure embodiments, mutatis mutandis.

According to a second aspect of the invention, there is provided a light shielding structure. The light shielding structure is for use in a light emitting device. The light shielding structure comprises a plurality of reflective barriers, each having an outer surface and a reflective inner surface. A light transmitting material extends between the outer surface and the reflective inner surface. The outer surface is oriented such that a portion of the light rays emitted by a first light source of a plurality of light sources is transmitted through a first lens of the plurality of lenses and through a first portion of said outer surface in the direction of the reflective inner surface.

The reflective inner surface is configured for reflecting said portion of the light rays in the direction of a second portion of said outer surface, said second portion being located further away from the base portion of the first lens than the first portion.

Preferred features of the light shielding structure disclosed above in connection with the light emitting device may also be used in embodiments of the light shielding structure of the invention.

An additional object of embodiments of the invention is to provide a light emitting device which can change the light distribution in a robust cost-effective manner, and in particular a light emitting device which can reduce the light intensities at large angles and which improves the G/G* classification of the light emitting device.

According to a third aspect of the invention, there is provided a light emitting device comprising a carrier, a plurality of light sources disposed on the carrier, a plurality of optical elements, and a spacer layer disposed between the carrier and the plurality of optical elements. The plurality of optical elements covers the plurality of light sources. The spacer layer is provided with a plurality of holes through which the plurality of light sources extends.

The inventors have observed that light emitting devices with a desired particular light distribution generally incorporate optical elements which are costly, of complex design, and can be the cause of delays in the fabrication line. To overcome the problem of manufacturing different types of optical elements according to different G/G* classifications a light emitting device must comply with, a light emitting device comprising a spacer layer as defined above can be used, resulting in a cheaper solution whilst being able to achieve a high G/G* classification. Moreover, with the light emitting device as defined above, it is also possible to easily achieve various G/G* classifications for the same plurality of optical elements, e.g. by varying the thickness of the spacer layer. Indeed, the thickness of the spacer layer can be adjusted in function of the desired correction of the light distribution.

Preferably, the plurality of optical elements is a plurality of lens elements. In that manner the amount of light rays at large angles can be reduced by increasing the thickness of the spacer layer as this will cause a larger distance between the light sources and the lens elements. More preferably, the plurality of lens elements is a plurality of free-form lenses having a symmetry plane perpendicular on the carrier. The term "free-form" typically refers to non-rotational symmetric lenses.

Preferably, the spacer layer has a thickness (t) larger than 0.1 mm, preferably larger than 0.3 mm, more preferably between 0.3 and 1 mm Such dimensions work well for typical light sources in outdoor luminaires. The thickness may be chosen such that it is avoided that light rays from the plurality of light sources directly reach the spacer layer.

Preferably, a light source of the plurality of light sources comprises a light emitting diode. More preferably, the light source comprises a substrate on which the light emitting diode is arranged. In such an embodiment, preferably the spacer layer has a thickness which is smaller than the thickness of the substrate. This will be particularly advantageous when the light source has a light emission range of 180°. When the light emission range is smaller than 180°, the thickness may also be slightly larger than the thickness of the substrate.

According to a preferred embodiment, the spacer layer is formed by one or more separate spacer plates disposed on the carrier. Such spacer plate is easy to manufacture and provides a particularly advantageous solution which can be implemented in existing luminaires without significant modifications to the manufacturing/assembling process of the luminaire.

According to another possible embodiment the spacer layer may be formed by a coating. For example, such coating may be applied on the carrier before mounting the plurality of optical elements.

According to a preferred embodiment, a lens element of the plurality of lens elements has an internal cavity facing a corresponding light source of the plurality of light sources. Preferably, in a contact plane between the spacer layer and the lens element, a hole of the plurality of holes surrounds the light source and a periphery of the internal cavity. In that manner, any light rays directly reaching the spacer layer (before reaching the lens element) can be reduced or avoided.

In an exemplary embodiment, the spacer layer is made of a transparent or translucent material. In that manner, light rays can enter the spacer layer, e.g. after reflection at an interface of the optical elements, and can be reflected by the carrier in a substantially similar way as if the spacer layer would not have been present.

In another exemplary embodiment, the spacer layer is made of a reflective material. In that manner, any light rays directed to the spacer layer, e.g. due to reflection at an interface of the optical elements, can be reflected by the spacer layer, e.g. in a substantially similar way as if they would have been reflected by the carrier.

Preferably, the spacer layer is made of a plastic material. Plastic materials are very suitable for making transparent, translucent or reflective plates with holes.

Preferably, the carrier is a printed circuit board. The plurality of light sources can then be arranged and electrically connected in a known manner to the PCB, wherein the plurality of light sources will typically comprise a plurality of light emitting diodes. It is noted that a light source may consist of one or more light emitting diodes, and that one or more light emitting diodes may be arranged below the same optical element.

In a preferred embodiment, the plurality of optical elements is included in one or more optical plates, preferably one or more lens plates. More preferably, the one or more optical plates are fixed by screwing, locking, clamping, clipping, gluing, or a combination thereof. The one or more optical plates may be fixed to the carrier, to the spacer layer or to a body portion of the luminaire.

More preferably, the one or more optical plates are fixed to the carrier by one or more screws or rivets extending through the spacer layer into the carrier. Optionally, the one or more screws may extend through the carrier into a body of a luminaire head.

Preferably, the plurality of optical elements, e.g. lens elements, is disposed on the spacer layer and is in contact with the spacer layer. For example, the one or more optical plates can be disposed directly on the spacer layer.

Preferably, the plurality of light sources and the plurality of holes are arranged according to an array comprising at least two rows and at least two columns. More preferably, also the plurality of optical elements is arranged according to an array comprising at least two rows and at least two columns.

According to a possible embodiment, the light emitting device further comprises a light shielding structure comprising a plurality of reflective barriers above the optical elements. The light shielding structure may be a separate component mounted on the optical elements, or may be integrally formed with the optical elements, e.g. by overmoulding.

The light shielding structure may be a light shielding structure as described in PCT application PCT/EP2019/074894 or in Dutch application NL2023295 in the name of the applicant, which are included herein by reference.

Preferred embodiments relate to a light emitting device for use in an outdoor luminaire By outdoor luminaire, it is meant luminaires which are installed on roads, tunnels, industrial plants, stadiums, airports, harbors, rail stations, campuses, parks, cycle paths, pedestrian paths or in pedestrian zones, for example, and which can be used notably for the lighting of an outdoor area such as roads and residential areas in the public domain, private parking areas and access roads to private building infrastructures, etc.

In a particular embodiment, preferably with a plurality of lens elements, one or more other optical elements may be provided to the plurality of lens elements, such as reflectors, backlights, prisms, collimators, diffusors, and the like. For example, there may be associated a backlight element with some lens elements or with each lens element. Those one or more other optical elements may be formed integrally with the lens element, and e.g. integrally with a lens plate. In other embodiments, those one or more other optical elements may be mounted on the lens elements. In the context of the invention, a lens element may include any transmissive optical element that focuses or disperses light by means of refraction. It may also include any one of the following: a reflective portion, a backlight portion, a prismatic portion, a collimator portion, a diffusor portion. For example, a lens element may have a lens portion with a concave or convex surface facing a light source, or more generally a lens portion with a flat or curved surface facing the light source, and optionally a collimator portion integrally formed with said lens portion, said collimator portion being configured for collimating light transmitted through said lens portion. Also, a lens may be provided with a reflective portion or surface, referred to as a backlight element in the context of the invention, or with a diffusive portion.

A lens element of the plurality of lens elements may comprise a lens portion having an outer surface and an inner surface facing the associated light source. The outer surface may be a convex surface and the inner surface may be a concave or planar surface. Also, a lens element may comprise multiple lens portions adjoined in a discontinuous manner, wherein each lens portion may have a convex outer surface and a concave inner surface. Lens elements are not limited to rotation-symmetric lenses such as hemispherical lenses, or to ellipsoidal lenses having a major symmetry plane and a minor symmetry plane, although such rotation-symmetric lenses could be used. Alternatively, lenses with no symmetry plane or symmetry axis could be envisaged.

According to a fourth aspect of the invention, there is provided a luminaire head comprising a light emitting device of any one of the previous embodiments.

Further embodiments of the invention are also defined by the following clauses.

1. A light emitting device comprising:
   a carrier;
   a plurality of light sources disposed on the carrier;
   a plurality of optical elements covering the plurality of light sources;
   a spacer layer disposed between the carrier and the plurality of optical elements;
   said spacer layer being provided with a plurality of holes through which the plurality of light sources extends.

2. The light emitting device according to clause 1, wherein the plurality of optical elements is a plurality of lens elements.

3. The light emitting device according to clause 1 or 2, wherein the spacer layer has a thickness, t, larger than 0.1 mm, preferably larger than 0.3 mm, more preferably between 0.3 and 1 mm.

4. The light emitting device according to any one of the previous clauses, wherein a light source of the plurality of light sources comprises a light emitting diode.

5. The light emitting device according to the previous clause, wherein the light source comprises a substrate on which the light emitting diode is arranged, wherein the spacer layer has a thickness which is smaller than the thickness of the substrate.

6. The light emitting device according to any one of the previous clauses, wherein the spacer layer is formed by one or more separate spacer plates disposed on the carrier.

7. The light emitting device according to any one of the clauses 1-5, wherein the spacer layer is formed by a coating.

8. The light emitting device according to clause 2 and any one of the previous claims, wherein a lens element of the plurality of lens elements has an internal cavity facing a corresponding light source of the plurality of light sources, wherein, in a contact plane between the spacer layer and the lens element, a hole of the plurality of holes surrounds the light source and a periphery of the internal cavity.

9. The light emitting device according to any one of the previous clauses, wherein the spacer layer is made of a transparent or translucent material.

10. The light emitting device according to any one of the clauses 1-8, wherein the spacer layer is made of a reflective material.

11. The light emitting device according to any one of the previous clauses, wherein the spacer layer is made of a plastic material.

12. The light emitting device according to any one of the previous clauses, wherein the carrier is a printed circuit board.

13. The light emitting device according to any one of the previous clauses, wherein the plurality of optical elements are included in one or more optical plates.

14. The light emitting device according to the previous clause, wherein the one or more optical plates are fixed by screwing, locking, clamping, clipping, gluing, or a combination thereof.

15. The light emitting device according to the previous clause, wherein the one or more optical plates are fixed to the carrier by screws extending through the spacer layer into the carrier.

16. The light emitting device according to any one of the previous clauses, wherein the plurality of optical elements are disposed on the spacer layer and are in contact with the spacer layer.

17. The light emitting device according to any one of the previous claims, wherein the plurality of light sources and the plurality of holes are arranged according to an array comprising at least two rows and at least two columns.

18. The light emitting device according to any one of the previous clauses, wherein the plurality of optical elements is arranged according to an array comprising at least two rows and at least two columns.

19. The light emitting device according to any one of the previous clauses, wherein the plurality of optical elements is a plurality of free form lenses having a symmetry plane, P1, perpendicular on the carrier.

20. The light emitting device according to any one of the previous clauses, further comprising a light shielding structure comprising a plurality of reflective barriers above the optical elements.

BRIEF DESCRIPTION OF THE FIGURES

This and other aspects of the present invention will now be described in more detail, with reference to the appended drawings showing a currently preferred embodiment of the invention. Like numbers refer to like features throughout the drawings.

FIGS. 3A-3B, respectively, shows an enlarged perspective view and the simulated incident and reflected light rays of an embodiment of a light emitting device, and illustrates a polar diagram of the light distribution according to an embodiment of a light shielding structure for use in a light emitting device;

FIGS. 4A-4B, respectively, shows an enlarged perspective view and the simulated incident and reflected light rays of another embodiment of a light emitting device, and illustrates a polar diagram of the light distribution according to another embodiment of a light shielding structure for use in a light emitting device;

FIGS. 5A-5B, respectively, shows an enlarged perspective view and the simulated incident and reflected light rays of yet another embodiment of a light emitting device, and illustrates a polar diagram of the light distribution according to yet another embodiment of a light shielding structure for use in a light emitting device;

FIGS. 6A-6B, respectively, shows an enlarged perspective view and the simulated incident and reflected light rays of still another embodiment of a light emitting device, and illustrates a polar diagram of the light distribution according to still another embodiment of a light shielding structure for use in a light emitting device;

FIGS. 7A-7F schematically illustrate six exemplary embodiments corresponding to six exemplary shapes of a light shielding structure for use in a light emitting device;

DESCRIPTION OF EMBODIMENTS

Figure 1:
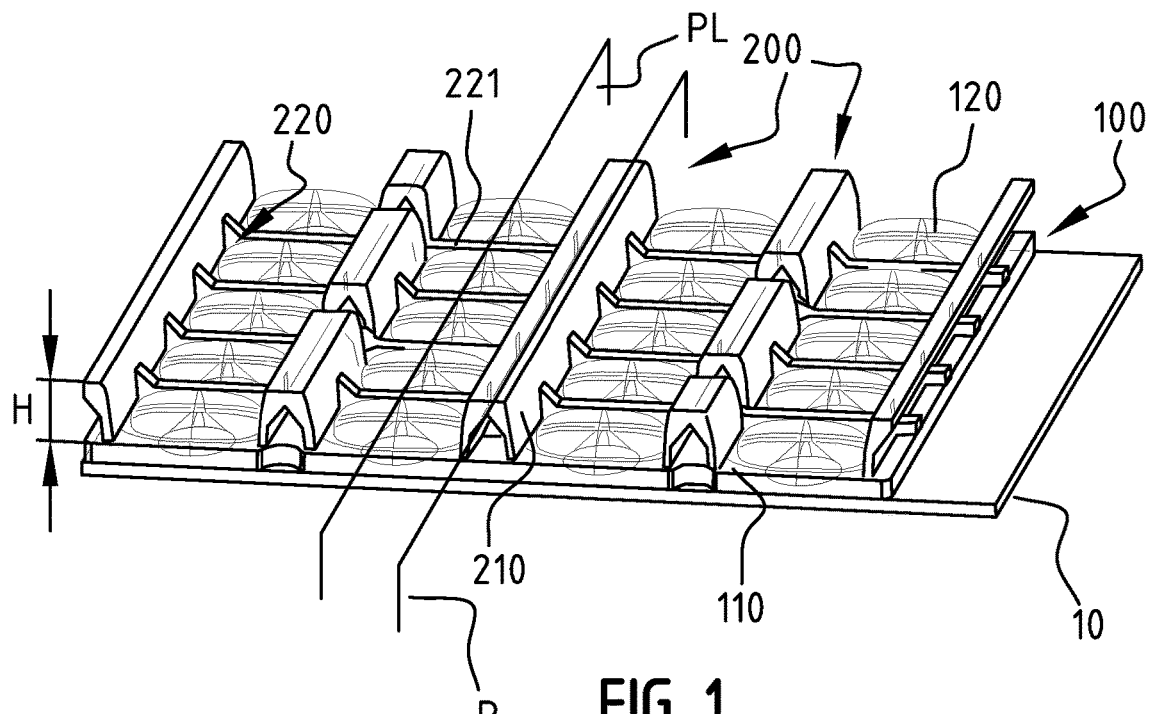
FIG. 1 shows a perspective view of an exemplary embodiment of a light emitting device.
Figure 2:
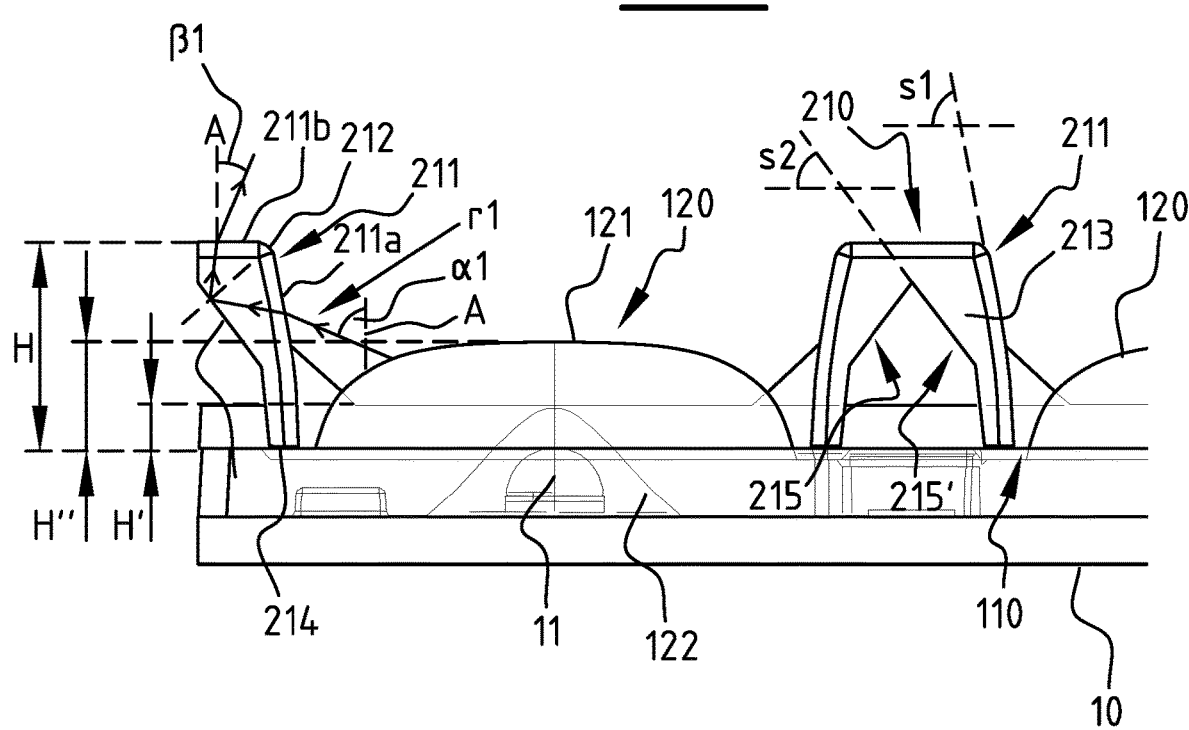
FIG. 2 shows an enlarged longitudinal cut-view of a light emitting device.

FIG. 1 shows a perspective view of an exemplary embodiment of a light emitting device according to the present invention. FIG. 2 shows an enlarged longitudinal cut-view of said light emitting device according to an exemplary embodiment of the present invention.

As illustrated in the embodiments of FIGS. 1 and 2, the light emitting device comprises a carrier 10, a plurality of light sources 11 disposed on the carrier 10, a plurality of lenses 120 disposed on the carrier 10, and a light shielding structure 200 mounted on said plurality of lenses 120. Each lens of the plurality of lenses 120 comprises a lens portion and a base portion surrounding said lens portion.

In the embodiment of FIGS. 1-2, the plurality of lenses 120 are integrally formed as part of a lens plate 100 and the plurality of base portions of the corresponding plurality of lenses 120 correspond to an upper flat surface 110 of the lens plate 100 interconnecting the plurality of lens portions. According to another embodiment, the plurality of lenses 120 may be separately formed and an optical structure may comprise a frame carrying the plurality of lenses 120. In yet another embodiment, the plurality of lenses 120 may be separately formed and mounted directly on the carrier 10. In yet another embodiment, the optical structure may comprise a frame and a lens plate 100 integrating the plurality of lenses 120, wherein the lens plate 100 is carried by the frame. Also, the frame may carry multiple lens plates 100 together integrating the plurality of lenses 120. The optical structure of FIG. 1 corresponds to the lens plate 100.

The light shielding structure 200 comprises a plurality of reflective barriers 210, each having an outer surface 211 and a first reflective inner surface 215. A light transmitting material 213 extends between the outer surface 211 and the first reflective inner surface 215. The outer surface 210 is oriented such that a portion of the light rays emitted by a first light source of the plurality of light sources 11 is transmitted through a first lens of the plurality of lenses 120 and through a first portion 211a of the outer surface in the direction of the first reflective inner surface 215. The first reflective inner surface 215 is configured for reflecting the portion of the light rays in the direction of a second portion 211b of the outer surface. The second portion 211b of the outer surface is located further away from the base portion of the first lens than the first portion 211a, in the embodiment of FIGS. 1-2 the second portion 211b is located further away from the lens plate 100 than the first portion 211a.

The first portion 211a of the outer surface of each reflective barrier 210 comprised in the light shielding structure 200 is configured to refract light rays impinging on the first portion 211a of the outer surface. The impinging light rays are light rays emitted by the first light source 11 and transmitted through the first lens of the plurality of lenses 120. The material between the outer surface and the first reflective inner surface 215 of each reflective barrier is a light transmitting material 213, i.e. transparent or translucent. The refracted light rays propagate within the light transmitting material 213 until they reach the first reflective inner surface 215. The first reflective inner surface 215 is arranged such that it faces the first and the second portions 211a, 211b of the outer surface. Thus, when the refracted light rays are reflected on the first reflective inner surface 215, they are redirected towards the second portion 211b of the outer surface. Since the second portion 211b of the outer surface is located further away from the lens plate 100 than the first portion 211a, and the first portion 211a of the outer surface is impinged with light rays transmitted through the first lens 120 at large angles, the light shielding structure 200 as defined above enables a reduction of the light intensities at large angles by redirecting these light rays through the second portion 211b of the outer surface; thereby improving the G/G* classification of the light emitting device.

A base surface 214 of each reflective barrier 210 may be disposed on the upper flat surface 110 of the lens plate. Each of the reflective barriers 210 may have a height H, measured perpendicular on the carrier 10. The height H may be larger than a height H" of the plurality of lenses 120, preferably larger than 110% of a height H" of the plurality of lenses 120. The height H" of the plurality of lenses 120 corresponds to the distance between a plane including the upper flat surface 110 of the lens plate surrounding the plurality of lenses 120 and the highest point of a lens of the plurality of lenses 120.

The outer surface 211 of the reflective barrier comprises the first portion 211a of the outer surface, and the second portion 211b of the outer surface, said second portion 211b being located further away from the lens plate 100 than the first portion 211a. The first portion 211a and the second portion 211b may be connected by a top edge 212 of the reflective barrier 210. The top edge 212 may be at a height H above the upper flat surface 110 of the lens plate.

The first reflective inner surface 215 may be a reflective sloping surface facing the first portion 211a and the second portion 211b, said reflective inner surface 215 being opposite the upper flat surface 110 of the lens plate. The reflective sloping surface of the first reflective inner surface 215 may be connected to the base surface 214 of the reflective barrier 210.

The first portion 211a of the outer surface may face the first lens of said plurality of lenses 120. The plurality of lenses 120 may be non-rotational symmetric lenses 120 comprising a symmetry plane P1 substantially perpendicular to the upper flat surface 110, and substantially parallel to the top edge 212 of the plurality of reflective barriers 210. Also an edge of the base surface 214 of the plurality of reflective barriers 210 may be substantially parallel to said symmetry plane P1.

The lens plate 100 may be disposed on the carrier 10 by screwing, locking, clamping, clipping, or a combination thereof. The plurality of light sources 11 may comprise light emitting diodes (LEDs). Preferably, the distance between two adjacent light sources is smaller than 60 mm, more preferably smaller than 50 mm, most preferably smaller than 40 mm Typically the distance between two adjacent light sources will be larger than 20 mm Preferably, the height of the plurality of reflective barriers is smaller than 10 mm, more preferably smaller than 8 mm, most preferably smaller than 7 mm, or even smaller than 6 mm.

As illustrated in the embodiment of FIG. 2, said first reflective inner surface 215 is configured for reflecting light rays emitted through the first lens of the plurality of lenses 120 having a first incident angle $\alpha 1$ with respect to an axis A. The axis A may be substantially perpendicular to the base surface 214, and the first incident angle $\alpha 1$ may be comprised between a first predetermined angle $\alpha p1$ and 90°.

The light rays reflected onto the first reflective inner surface 215 may be redirected towards the second portion 211b of the outer surface. The light rays emerging from the second portion 211b of the outer surface may have an emergent angle $\beta 1$ with respect to the axis A substantially perpendicular to the carrier 10, said emergent angle $\beta 1$ being smaller than 60°. It is noted that the light rays of FIG. 2 are representations from a simplified schematic drawing, and that the direction of the light ray has been simplified in the sense that the refraction by the lens 120 is not drawn. The first incident angle $\alpha 1$ is the angle of a light ray between the first lens 120 and the axis A, i.e. a direction of a light ray after it has exited the first lens 120. The first predetermined angle apt may be comprised between 60° and 85°, preferably between 70° and 80°. The emergent angle $\beta 1$ may be comprised between 0° and 50°, preferably between 0° and 45°.

At least one reflective barrier of the plurality of reflective barriers 210 may further comprise a second reflective inner surface 215' opposite the first reflective inner surface 215. The second reflective inner surface 215' may be configured for reflecting light rays emitted through a second lens of said plurality of lenses 120 adjacent to the first lens 120 associated with the first reflective inner surface 215. The emitted light rays through the second lens 120 may have a second incident angle with respect to the axis A substantially perpendicular to the base surface 214 comprised between a second predetermined angle $\alpha p2$ and 90°, with a second emergent angle $\beta 2$ with respect to said axis A smaller than 60°. The second predetermined angle $\alpha p2$ may be comprised between 60° and 85°, preferably between 70° and 80°. The second emergent angle $\beta 2$ may be comprised between 0° and 50°, preferably between 0° and 45°.

As above-mentioned, the axis A may be an axis intersecting the first lens of said plurality of lenses 120 substantially perpendicular to the upper flat surface 110 of the lens plate. The axis A may also correspond to the optical axis of the first lens of the plurality of lenses 120. The axis A may also be a third axis A corresponding to the optical axis of the second lens.

As illustrated in the embodiment of FIG. 1, the light emitting device may comprises twenty light sources 11 disposed on the carrier 10. Accordingly, the lens plate 100 comprises twenty lenses 120, each lens 120 covering one light source 11. It is noted that instead of providing one lens plate 100 with twenty lenses 120, it is also possible to provide a plurality of lens plates with less lenses, e.g. five lens plates with each four lenses. Each light source 11 may comprise several LEDs. The twenty lenses 120 are aligned into five rows R and four columns C (5×4) to form a two-dimensional array of lenses 120.

However, it should be clear for the skilled person that the number of light sources 11 and/or the number of lenses 120 may vary in other embodiments. It should also be clear for the skilled person that other arrangements of lenses 120 may be envisaged in other embodiments. In a first exemplary embodiment, the lens plate 100 may comprise four lenses 120 aligned into two rows R and two columns C (2×2). In a second exemplary embodiment, the lens plate 100 may comprise six lenses 120 aligned into two rows R and three columns C (2×3), or three rows R and two columns C (3×2). In yet a third exemplary embodiment, the lens plate 100 may comprise nine lenses 120 aligned into three rows R and three columns C (3×3). Many other embodiments may be envisaged, such as (2×4), (3×4) arrangements of lenses 120, etc. In yet other embodiments, the lens plate 100 may comprise more than twenty lenses 120.

As illustrated in the embodiment of FIG. 1, the light shielding structure 200 comprises a single light shielding module. In another embodiment, the light shielding structure 200 may be made of a plurality of light shielding modules. The light shielding structure 200 of FIG. 1 comprises twenty-five interconnected reflective barriers 210. Among these twenty-five reflective barriers 210, fifteen reflective barriers 210 further comprise a second reflective inner surface 215' opposite the first reflective inner surface 215. The ten remaining reflective barriers 210 only comprise a first reflective inner surface 215, and are located at opposite ends of the upper flat surface 110 of the lens plate 100.

However, it should be clear for the skilled person that the number of reflective barriers 210 of a light shielding structure or module, and the number of light shielding modules may vary in other embodiments. In a first exemplary embodiment, only one reflective barrier 210 may be present, resulting in a first glare reduction compared to a situation wherein the light emitting device does not comprise any light shielding structure 200. In a second exemplary embodiment, one light shielding module comprising a plurality of reflective barriers 210 may be present, resulting in a further glare reduction. In a third exemplary embodiment, two light shielding modules may be present, resulting in an even further glare reduction. Note that the above-mentioned different glare reductions may correspond to different G/G* classifications.

In non-illustrated embodiments wherein the light shielding structure 200 comprises reflective barriers 210 associated with each lens of the plurality of lenses 120, the reflective barriers 210 being substantially centrally located with respect to the lens plate 100 may be substantially higher (lower) than the reflective barriers 210 being located at the periphery of the lens plate 100. Additionally, the reflective barriers 210 within different light shielding modules may have different heights. For example, reflective barriers 210 of a given light shielding module of a plurality of light shielding modules facing associated lenses 120 located in a central portion of the lens plate 100 may be higher or lower than the reflective barriers 210 of another light shielding module of the plurality of light shielding modules facing associated lenses 120 located in a peripheral portion of the lens plate 100.

In the embodiment of FIG. 1, fifteen of the twenty-five reflective barriers 210 are disposed between adjacent columns C of lenses 120; five reflective barriers between the first column and the second column, five reflective barriers between the second column and the third column, and five reflective barriers between the third column and the fourth column. The first reflective inner surface 215 and the second reflective inner surface 215' of fifteen of the twenty-five reflective barriers 210 may be symmetric with respect to a plane P substantially perpendicular to the upper flat surface 110 of the lens plate and at equal distance from the first lens and the second lens of the plurality of lenses 120.

In other embodiments, these reflective barriers 210 may be asymmetric with respect to said plane P. For example, in an embodiment, the first and second lenses 120 are lenses having different optical properties and the first and second reflective inner surfaces 215, 215' may be adapted to achieve similar results with respect to cutting off or redirecting light rays having a large incident angle despite the differences between the first and second lenses 120. In another embodiment, the first lens 120 is configured for shaping a light distribution towards a first path for a first type of users and the second lens 120 is configured for shaping a light distribution towards a second path for a second type of users; the first and second reflective inner surfaces 215, 215' may be configured accordingly in order to achieve different G/G* classification appropriate for the different paths and types of users.

In other embodiments, at least one of the twenty-five reflective barriers 210 may be disposed between two adjacent columns C. More generally, in exemplary embodiments reflective barriers 210 may be provided between some pairs of adjacent columns C, or between all pairs. Moreover, the reflective barriers 210 may be provided along an entire column C, or along only a portion of a column C.

As illustrated in the embodiment of FIG. 1, the twenty lenses 120 are twenty non-rotational symmetric lenses 120 comprising a symmetry plane P1 substantially perpendicular to the upper flat surface 110 of the lens plate, and substantially parallel to the top edge 212 of the twenty-five reflective barriers 210. Also each of the first reflective inner surfaces 215 of the twenty-five reflective barriers 210 are substantially facing said symmetry plane P1. Each of the second reflective inner surfaces 215' of the twenty-five reflective barriers 210 are substantially facing said symmetry plane P1. However, it should be clear for the skilled person that in other embodiments at least one lens may be a rotation-symmetric lens, such as a hemispherical lens or an ellipsoidal lens having a major symmetry plane and a minor symmetry plane. In another embodiment, at least one lens may have no symmetry. In yet another embodiment at least one lens may be a free-form lens.

In the embodiment of FIG. 1, the four columns C are formed along the symmetry plane P1. The first reflective inner surface 215 of the twenty-five reflective barriers 210 is facing one associated lens of the twenty lenses 120 belonging to one column of said four columns C. The second reflective inner surface 215' of fifteen of the twenty-five reflective barriers 210 is facing one associated lens of the twenty lenses 120 belonging to the first column or to the fourth column. However, it should be clear for the skilled person that in other embodiments the first reflective inner surface 215 of the at least one reflective barrier of the plurality of reflective barriers 210 may be facing one or more associated lenses of the plurality of lenses 120 belonging to one column of said plurality of columns C. It should be also clear for the skilled person that in other embodiments the second reflective inner surface 215' of the at least one reflective barrier of the plurality of reflective barriers 210 may be facing one or more associated lenses of the plurality of lenses 120 belonging to a column which is adjacent to said column.

As illustrated in the embodiment of FIG. 1, the light shielding module of the light shielding structure 200 further comprises a connecting means 220, preferably disposed on said upper flat surface 110, between two adjacent rows of the five rows R. The connecting means 220 is composed of sixteen connecting portions 221, each connecting portion 221 being configured to connect two reflective barriers 210 arranged at one side of two associated lenses to two other reflective barriers 210 arranged at the other side of said two associated lenses. However, it should be clear for the skilled person that in other embodiments the connecting means 220 may be composed of more or less than sixteen connecting portions 221, depending on the amount of reflective barriers 210 comprised in the light shielding module 200. More generally, a light shielding structure 200 may comprise any number of light shielding modules, and each light shielding module may comprises any number of interconnected reflective barriers.

Alternatively or additionally to lenses 120, the lens plate 100 may comprise other optical elements, such as reflectors, backlights, prisms, collimators, diffusors, and the like. A lens plate 100 may comprise a plurality of backlight elements. A backlight element of the plurality of backlight elements may be associated with each lens of the plurality of lenses 120, and may be arranged substantially perpendicular to the symmetry plane P1. In other embodiments, backlight elements may be associated with only a subset of the plurality of lenses 120. Those one or more other optical elements, such as backlight elements, may be formed integrally with the lens plate 100. In other embodiments, those one or more other optical elements may be formed integrally with the light shielding structure 200, and/or mounted on the lens plate 100 and/or on the light shielding structure 200 via releasable fastening elements. Optionally, the lens plate 100 is provided with holes for fixation to the carrier 10. The carrier 10 may comprise a printed circuit board (PCB).

As shown in FIG. 2, a lens of the plurality of lenses 120 may comprise a lens portion having an outer surface 121 and an inner surface 122 facing the associated light source 11. The outer surface 121 may be a convex surface and the inner surface 122 may be a concave or planar surface. In other non-illustrated variants, a lens may 120 comprise multiple lens portions adjoined in a discontinuous manner, wherein each lens portion may have a convex outer surface and a concave inner surface.

The material of the light shielding structure 200 may comprise plastic. Preferably, the plastic used for manufacturing the light shielding structure 200 is a clear transparent plastic, but plastic of a different color and/or translucent plastic may be envisaged. In one embodiment, the light shielding structure 200 and the lens plate 100 may be integrally formed. The light shielding structure 200 may also comprise other materials than plastic. The first and/or second reflective inner surface 215, 215' of the reflective barrier 210 may be covered with white painting or with painting of a different color, or with a reflective coating. In an embodiment, a surface roughness of the first and/or second reflective inner surface 215, 215' may correspond to any one of a coarse surface finish, a polished surface finish, or a combination thereof. The surface roughness may be the same for the first reflective inner surface 215 of each reflective barrier 210, or may be different from one reflective barrier 210 to another. Similarly, a surface roughness of the second reflective inner surface 215' may correspond to any one of a coarse surface finish, a polished surface finish, or a combination thereof. The surface roughness may be the same for the second reflective inner surface 215' of each reflective barrier 210, or may be different from one reflective barrier 210 to another. In different embodiments, the first reflective inner surface 215 and the second reflective inner surface 215' may present a different surface roughness.

FIGS. 7A-7F schematically illustrate six exemplary embodiments corresponding to six exemplary shapes of a reflective barrier of a light shielding structure for use in a light emitting device. The reflective barrier 210 comprises a first portion 211a of an outer surface, a second portion 211b of an outer surface, a first reflective inner surface 215 and/or a second reflective inner surface 215'.

As illustrated in the embodiments of FIGS. 7A-7F, the first reflective inner surface 215 of the reflective barrier 210 may comprise any one of a concave surface, a convex surface, a flat surface, or a combination thereof. Similarly, the second reflective inner surface 215' may comprise any one of a concave surface, a convex surface, a flat surface, or a combination thereof. Also the first and the second portions 211a, 211b of the outer surface may comprise any one of a concave surface, a convex surface, or a flat surface. The surfaces comprised in the first reflective inner surface 215 and in the second reflective inner surface 215' are configured for redirecting light rays emitted through the associated first lens of said plurality of lenses (not shown) having an incident angle with respect to an axis substantially perpendicular to the lens plate/base surface 214 comprised between a first or second predetermined angle and 90°, with a first or second emergent angle with respect to said axis smaller than 60°. The first or second predetermined angle may be comprised between 60° and 85°, preferably between 70° and 80°. The first or second emergent angle may be comprised between 0° and 50°, preferably between 0° and 45°.

FIG. 7A displays a symmetrical reflective barrier 210 with a first reflective inner surface 215 and a second reflective inner surface 215' comprising each a flat surface and another flat surface at an angle with each other. The flat surface and the another flat surface may be inclined, i.e. substantially not perpendicular to the base surface 214 of the reflective barrier, in order to avoid reflecting backward incident light ray from the first lens having a large incident angle with a reflection angle substantially equal to the incident angle. The flat surfaces of the reflective inner surfaces 215, 215' closer to the base surface 214 of the reflective barrier may have a higher inclination that the another surfaces included in the reflective inner surface 215, 215'. The first portion 211a of the outer surface may be a flat surface inclined with respect to the lens plate in a direction away from the associated lens. The second portion 211b of the outer surface may be a flat surface substantially parallel to the lens plate and connected to the first portion 211a of the outer surface on the side of the first reflective inner surface 215 and to the first portion 211a of the outer surface on the side of the second reflective inner surface 215'.

FIG. 7B displays symmetrical reflective barrier 210 with a first reflective inner surface 215 and a second reflective inner surface 215' having a concave surface. The first portion 211a of the outer surface may be a flat surface inclined with respect to the lens plate in a direction away from the associated lens. The second portion 211b of the outer surface may be a flat surface substantially parallel to the lens plate and connected to the first portion 211a of the outer surface on the side of the first reflective inner surface 215 and to the first portion 211a of the outer surface on the side of the second reflective inner surface 215'.

FIG. 7C displays a symmetrical reflective barrier 210 with a first reflective inner surface 215 and a second reflective inner surface 215' joined as a continuous concave surface. The first portion 211a and the second portion 211b of the outer surface may be concave surfaces forming a continuous convex surface.

FIG. 7D displays a symmetrical reflective barrier 210 with a first reflective inner surface 215 and a second reflective inner surface 215' having a flat surface. The first and second reflective inner surfaces 215, 215' are linked by a third reflective inner surface 215" having a flat surface. The first and second reflective inner surfaces 215, 215' may be inclined with respect to the lens plate in a direction away from the associated lens. The flat surface of the third reflective inner surface 215" may be a flat surface substantially parallel to the lens plate. The first portion 211a of the outer surface may be a flat surface substantially perpendicular to the lens plate. The second portion 211b of the outer surface may be a concave surface facing the lens plate.

FIG. 7E displays a symmetrical reflective barrier 210 with a first reflective inner surface 215 and a second reflective inner surface 215' having a concave surface. The reflective barrier of FIG. 7E is split in a first part associated to the first reflective inner surface 215, and a second part associated to the second reflective inner surface 215", such that the reflective inner surface is open centrally at the top of the reflective barrier. Each of the first part and the second part comprises a first portion 211a, 211a' and a second portion 211b, 211b' of the outer surface. The first portions 211a, 211a' of the outer surface of the first and second parts of the reflective barrier have a convex surface. The second portions 211b, 211b' of the outer surface of the first and second parts of the reflective barrier have a flat surface substantially parallel to the lens plate.

FIG. 7F displays an asymmetrical reflective barrier 210 with a first reflective inner surface 215. The first reflective inner surface 215 may be an inclined flat surface extending away from the associated lens. The first portion 211a of the outer surface may be a flat surface substantially perpendicular to the lens plate. The first portion 211a of the outer surface is joined in a continuous manner to the second portion 211b of the outer surface. The second portion 211b of the outer surface may be substantially parallel to the lens plate.

In FIGS. 7A-7E, the height of the reflective barrier 210 may be substantially larger than the width of the base surface 214 of the reflective barrier. Additionally or alternatively, the height of the reflective barrier in the FIGS. 7A-7F may be larger than the height of the associated one or more lenses, preferably larger than 110% of said height. Preferably, the height of the plurality of reflective barriers 210 and/or of the at least one further reflective barrier (not shown) is smaller than 10 mm, more preferably smaller than 8 mm, most preferably smaller than 7 mm, or even smaller than 6 mm. This range of heights enables the plurality of reflective barriers 210 to efficiently cut off or redirect light rays having a large incident angle, thereby enabling to efficiently adapt the G/G* classification of the light emitting device.

It should be clear for the skilled person that embodiments illustrating other combinations of surfaces comprised in the first reflective inner surface 215, in the second reflective inner surface 215', in the first portion 211a of the outer surface, and in the second portion 211b of the outer surface may be envisaged.

The first reflective inner surface 215 and/or the second reflective inner surface 215' may be covered with white painting or with painting of a different color, or with a reflective coating. In an embodiment, a surface roughness of the first reflective inner surface 215 may correspond to any one of a coarse surface finish, a polished surface finish, or a combination thereof. Similarly, a surface roughness of the second reflective inner surface 215' may correspond to any one of a coarse surface finish, a polished surface finish, or a combination thereof.

Figure 3B:
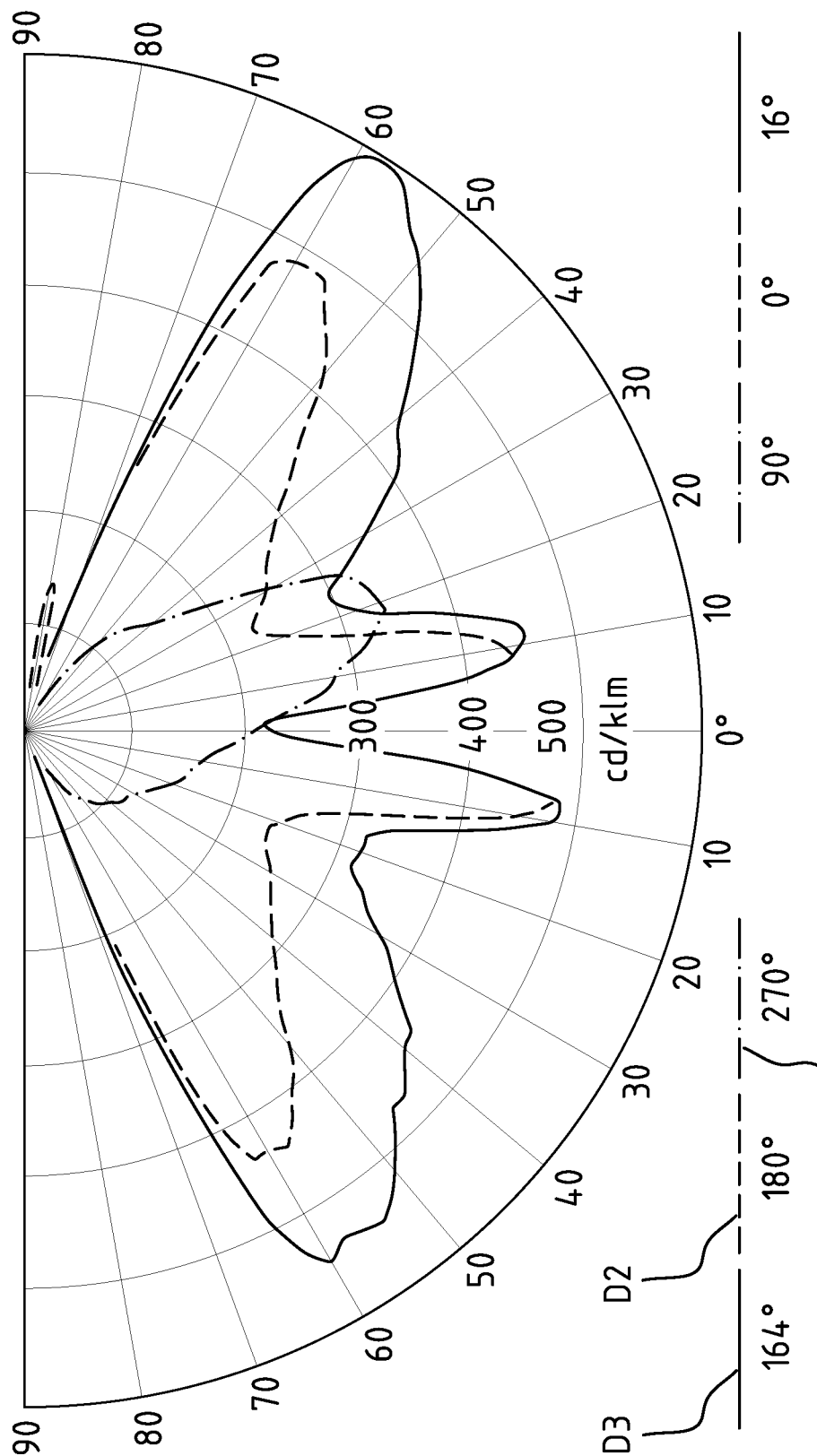

FIGS. 3A-3B, respectively, shows an enlarged perspective view and the simulated incident and reflected light rays of an embodiment of a light emitting device, and illustrates a polar diagram of the light distribution according to an embodiment of a light shielding structure for use in a light emitting device according to the present invention.

The light shielding structure 200 for use in the light emitting device of FIG. 3A corresponds to the light shielding structure 200 described with respect to FIG. 7A. The embodiment of light distribution considered in relation with FIG. 3B depict polar diagrams D1, D2, D3, respectively showing the light distribution at 90°-270°, i.e. in the symmetry plane P1 of FIG. 1, 0°-180°, i.e. in a plane perpendicular to the plurality of lenses and to the symmetry plane P1, and 16°-164°.

The light shielding structure 200 of FIG. 3A comprises a plurality of reflective barriers 210 including a first portion 211a of an outer surface, a second portion 211b of the outer surface, and a first reflective inner surface 215. Each of the reflective barriers 210 is associated to a first lens 120 of a plurality of lenses. The lens 120 of the plurality of lenses may comprise a lens portion having an outer surface 121, and an inner surface 122 facing the associated light source 11. The outer surface 121 may be a convex surface and the inner surface 122 may be a concave surface.

As illustrated in the embodiment of FIG. 3A, the first reflective inner surface 215 is configured for reflecting a portion of light rays r1 emitted through the first lens 120 of the plurality of lenses having a first incident angle α1 with respect to an axis A. The axis A may be substantially perpendicular to the base surface 214, and the first incident angle α1 may be comprised between a first predetermined angle apt and 90°. The light rays reflected onto the first reflective inner surface 215 may be redirected towards the second portion 211b of the outer surface. The light rays emerging from the second portion 211b of the outer surface may have an emergent angle β1 with respect to the axis A substantially perpendicular to the carrier 10, said emergent angle β1 being smaller than 60°.

It is noted that the light rays of FIG. 3A are simulated light rays, and that the angles indicated on FIG. 3A are merely indicative of a general angle of the light rays with respect to the axis A. The first incident angle α1 is the angle of the light rays between the lens 120 and the axis A, i.e. a direction of the light rays after they have exited the lens 120 at a large angle. The first predetermined angle αp1 may be comprised between 60° and 85°, preferably between 70° and 80°. The emergent angle β1 may be comprised between 0° and 50°, preferably between 0° and 45°.

From FIG. 3B, it can be clearly seen that polar diagrams D2 and D3 represent a cone of light whose emission angle is contained below 70°. Additionally, D2 and D3 show two extrema of light intensities around 10°, which correspond to light rays emitted at large angles and redirected by the reflective barrier of the light shielding structure. Therefore, it may be concluded that the light intensity at large angles that may correspond to glaring angles has been effectively suppressed.

Figure 4B:
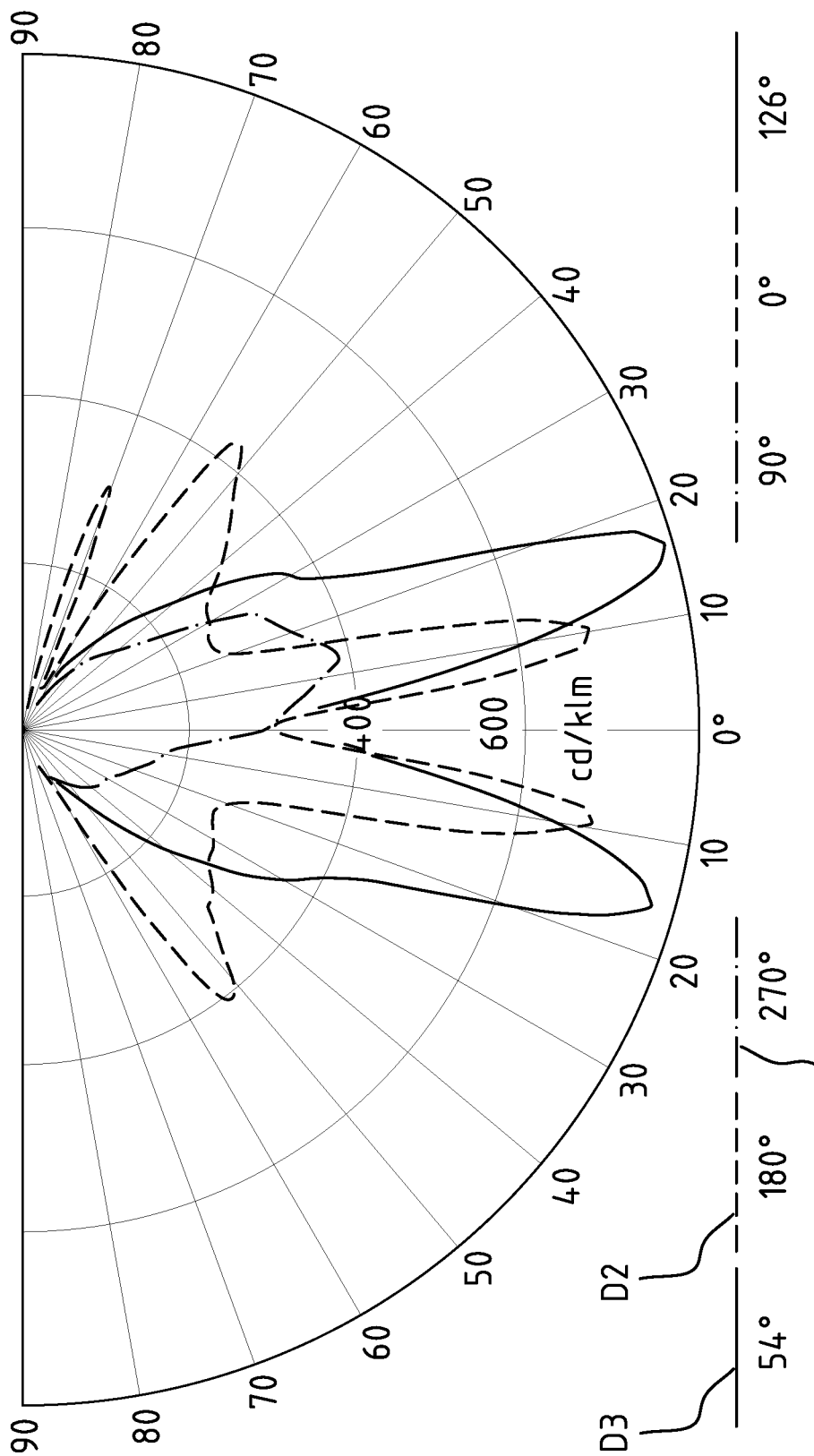

FIGS. 4A-4B, respectively, shows an enlarged perspective view and the simulated incident and reflected light rays of another embodiment of a light emitting device, and illustrates a polar diagram of the light distribution according to another embodiment of a light shielding structure for use in a light emitting device.

The light shielding structure 200 for use in the light emitting device of FIG. 4A corresponds to the light shielding structure 200 described with respect to FIG. 7A, but with a larger height than in the embodiment of FIG. 3A. The embodiment of light distribution considered in relation with FIG. 4B depict polar diagrams D1, D2, D3, respectively showing the light distribution at 90°-270°, i.e. in the symmetry plane P1 of FIG. 1, 0°-180°, i.e. in a plane perpendicular to the plurality of lenses and to the symmetry plane P1, and 24°-126°.

From FIG. 4B, it can be clearly seen that polar diagrams D2 and D3 represent a cone of light whose emission angle is contained below 60°. Additionally, D2 and D3 show two extrema of light intensities close to 0°. Compared with the embodiment of FIG. 3B, more light is redirected by the reflective barrier which results in a larger intensity of the extrema of light intensities close to 0° than in the embodiment of FIG. 3B. So by varying the height of the light shielding structure, the cut-off/redirection angle of light emitted through the lens can be varied and adapted in function of the G/G* classification that needs to be obtained.

Figure 5B:
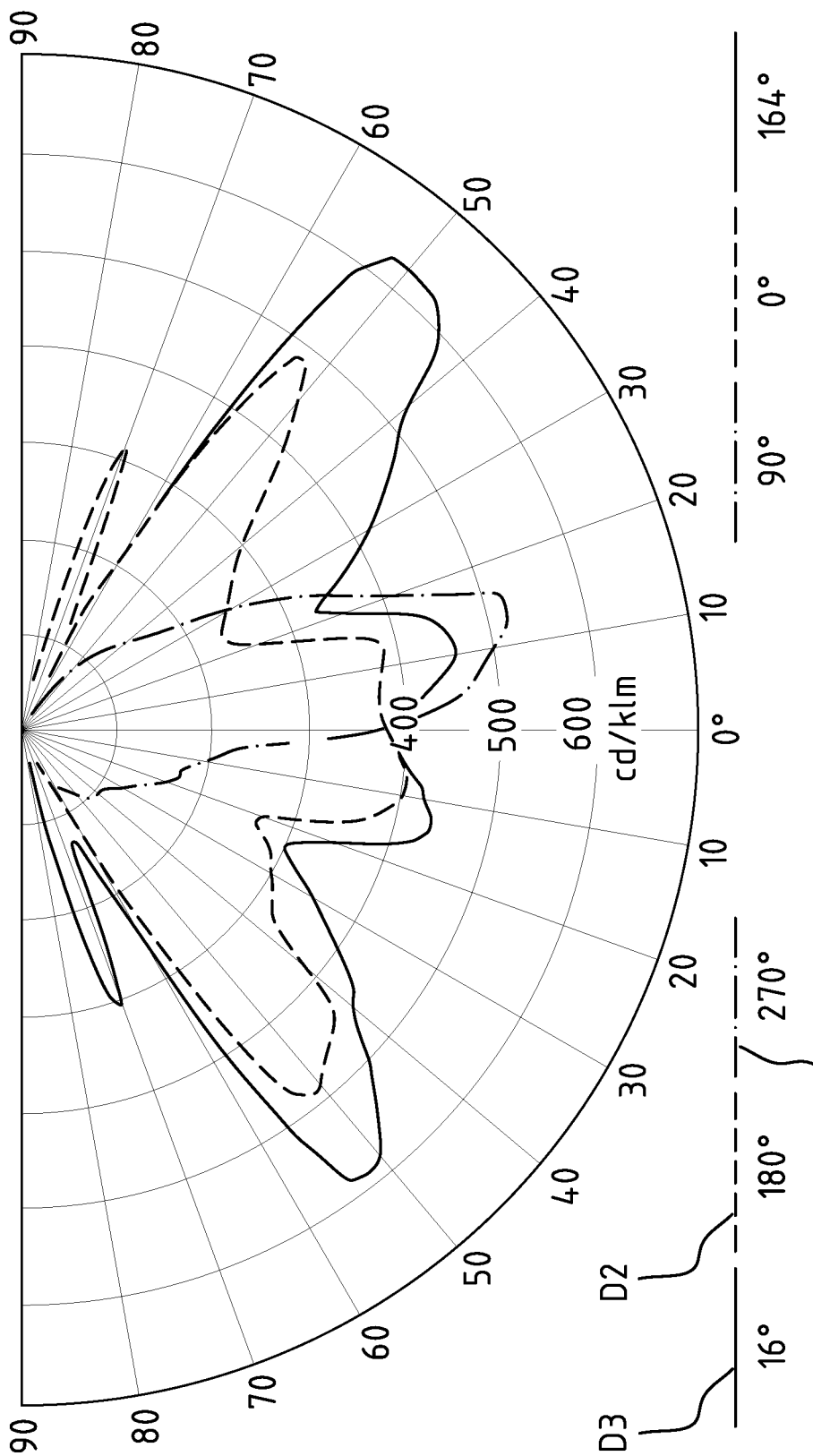

FIGS. 5A-5B, respectively, shows an enlarged perspective view and the simulated incident and reflected light rays of yet another embodiment of a light emitting device, and illustrates a polar diagram of the light distribution according to yet another embodiment of a light shielding structure for use in a light emitting device.

The light shielding structure 200 for use in the light emitting device of FIG. 5A corresponds to the light shielding structure 200 described with respect to FIG. 7B. The embodiment of light distribution considered in relation with FIG. 5B depict polar diagrams D1, D2, D3, respectively showing the light distribution at 90°-270°, i.e. in the symmetry plane P1 of FIG. 1, 0°-180°, i.e. in a plane perpendicular to the plurality of lenses and to the symmetry plane P1, and 16°-164°.

From FIG. 5B, it can be clearly seen that polar diagrams D2 and D3 represent a cone of light whose emission angle is contained below 60°. Additionally, D2 and D3 show two extrema of light intensities close to 0°. Compared with the embodiments of FIGS. 3B and 4B, the extrema of light intensities close to 0° are less pronounced due to the more even angular distribution of the light rays reflected off the first reflective inner surface 215 with its concave surface. Hence, by varying the shape of the first reflective inner surface 215, the light distribution of the light rays can be changed.

FIGS. 6A-6B, respectively, shows an enlarged perspective view and the simulated incident and reflected light rays of yet another embodiment of a light emitting device, and illustrates a polar diagram of the light distribution according to yet another embodiment of a light shielding structure for use in a light emitting device.

The light shielding structure 200 for use in the light emitting device of FIG. 6A corresponds to the light shielding structure 200 described with respect to FIG. 7A, but with a convex flat surface instead of the flat surface of the first reflective inner surface 215. The embodiment of light distribution considered in relation with FIG. 3B depict polar diagrams D1, D2, D3, respectively showing the light distribution at 90°-270°, i.e. in the symmetry plane P1 of FIG. 1, 0°-180°, i.e. in a plane perpendicular to the plurality of lenses and to the symmetry plane P1, and 16°-164°.

From FIG. 6B, it can be clearly seen that polar diagrams D2 and D3 represent a cone of light whose emission angle is contained below 60°. Additionally, D2 and D3 show two extrema of light intensities close to 0°. Compared with the embodiments of FIGS. 3B, 4B, and 5B, the extrema of light intensities close to 0° are lower and less pronounced due to the convex surface of the first reflective inner surface 215 which distributes the light rays reflected over a broader angular range.

Note that FIG. 8, FIG. 9, and FIGS. 10A-10D illustrate exemplary embodiments of a light shielding structure for use in a light emitting device in a schematic manner. The light shielding structure in these exemplary embodiments comprises a plurality of reflective barriers similar to the plurality of reflective barriers described with respect to FIG. 1. Each of the plurality of reflective barriers illustrated comprises an outer surface and at least a first reflective inner surface.

Figure 8:
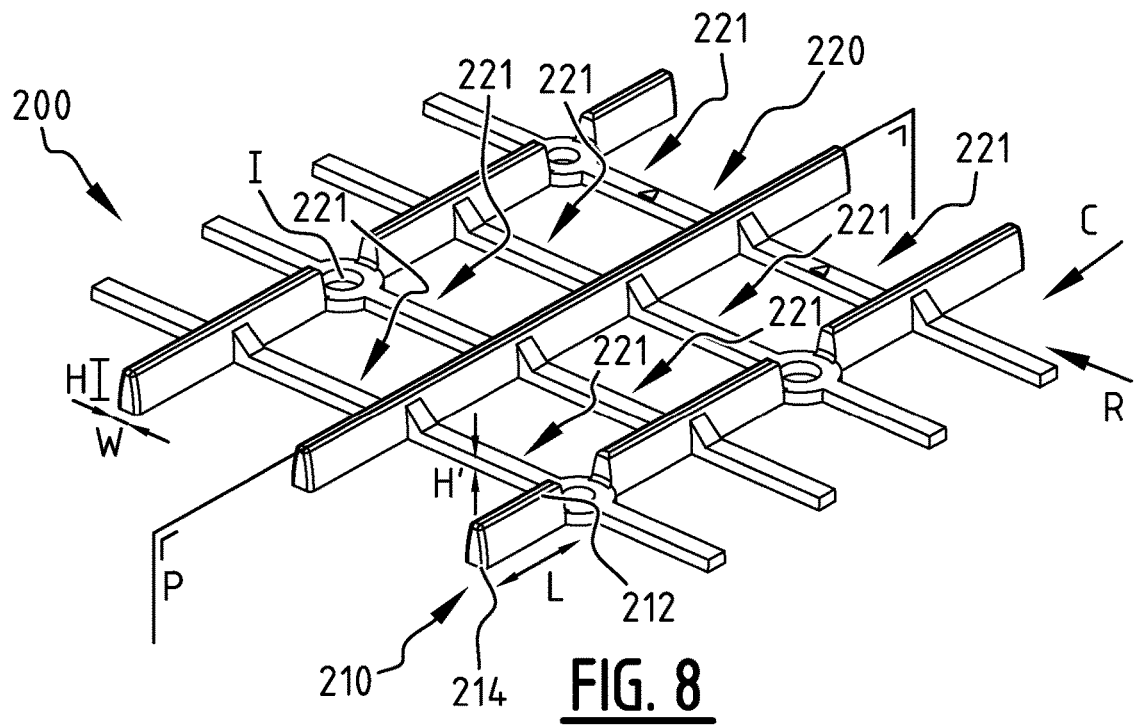
FIG. 8 shows a perspective view of another exemplary embodiment of a light shielding structure for use in a light emitting device.
Figure 9:
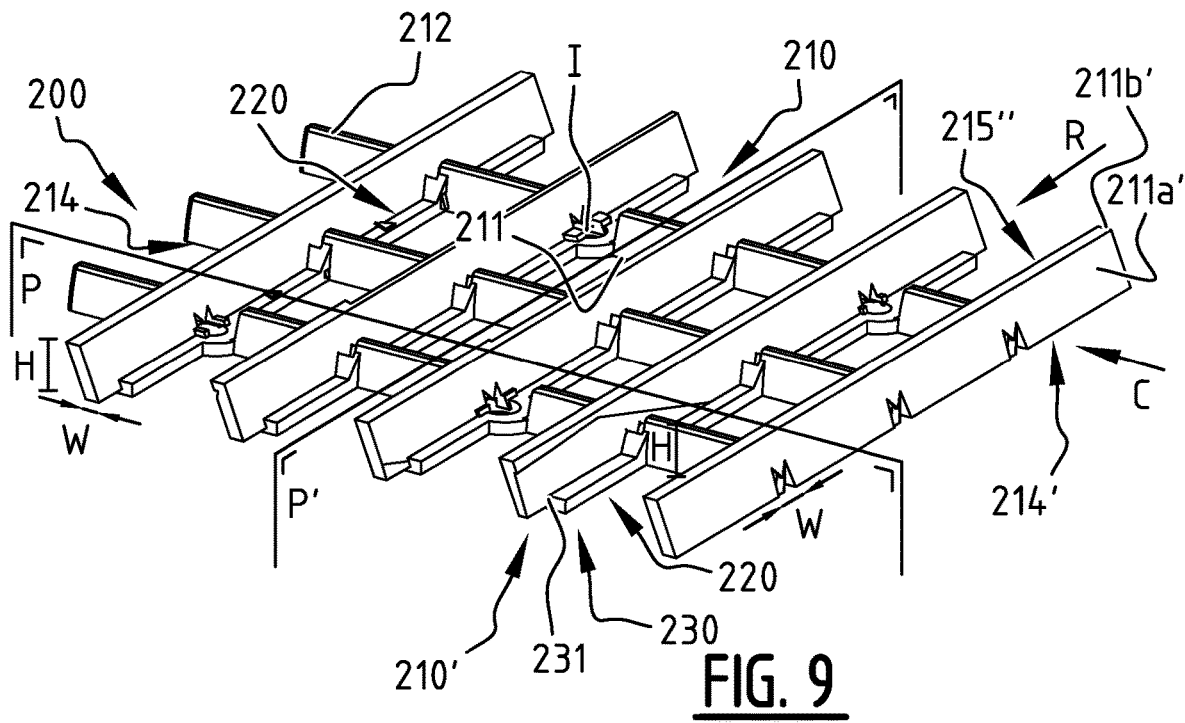
FIG. 9 shows a perspective view of yet another exemplary embodiment of a light shielding structure for use in a light emitting device.
Figure 10A:
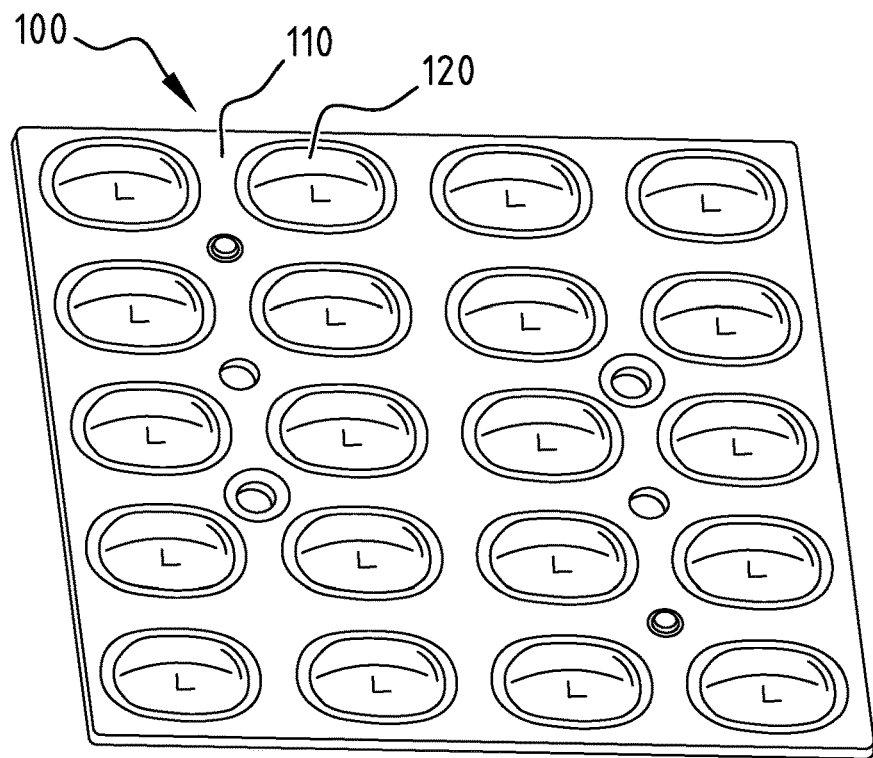
FIGS. 10A-10D respectively show a perspective view of four exemplary embodiments of a light emitting device.
Figure 10B:
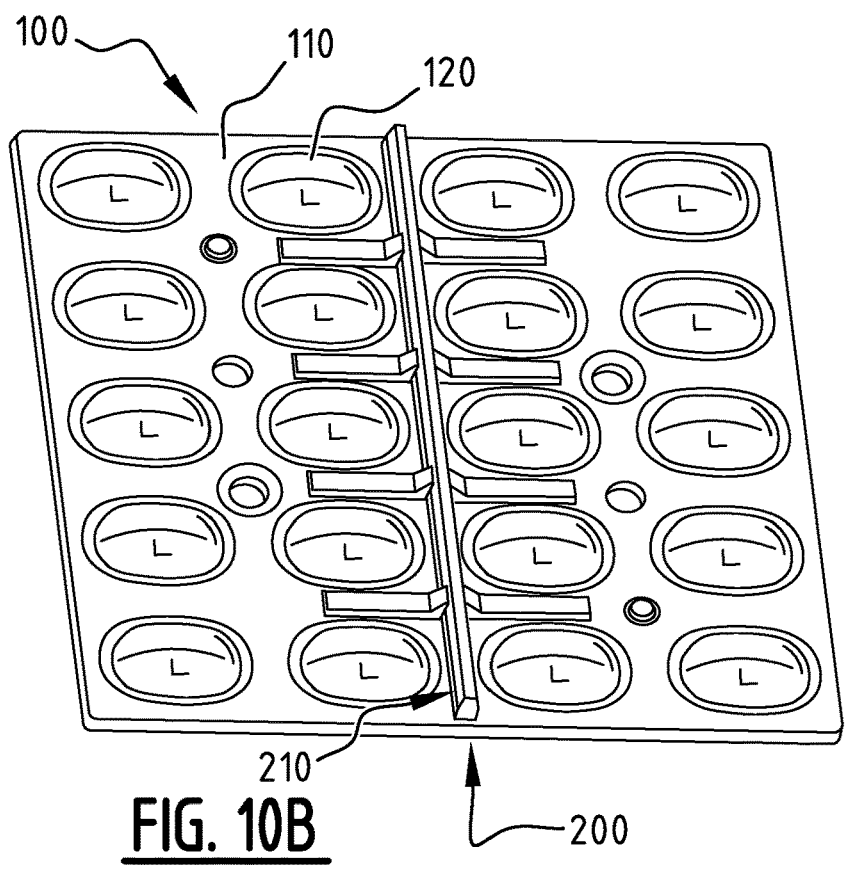
Figure 10C:
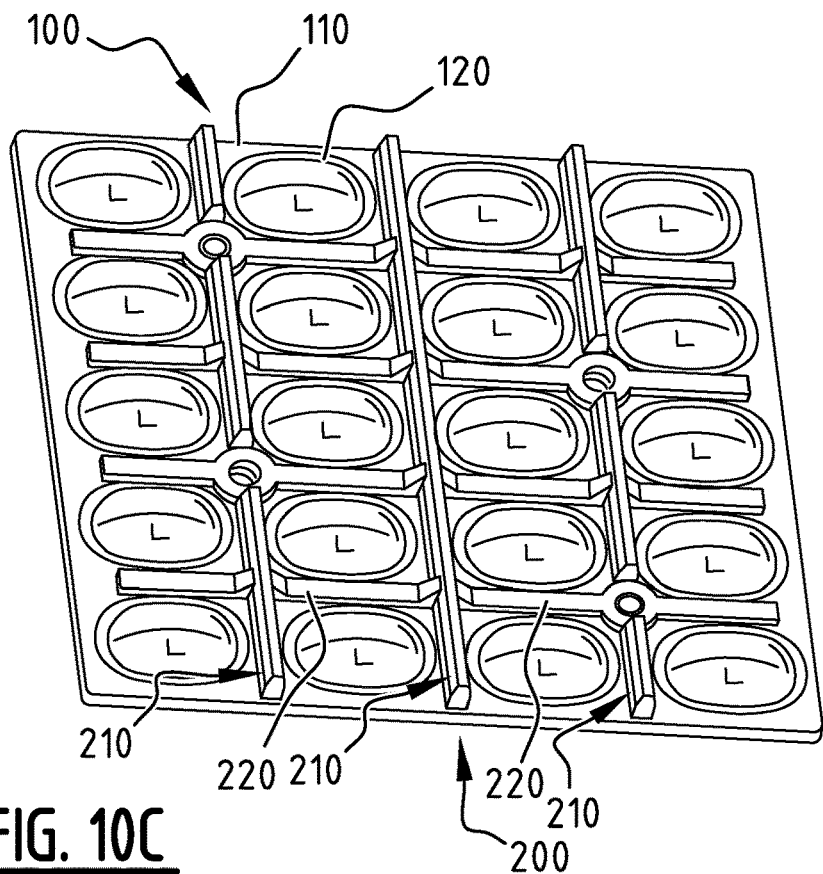
Figure 10D:
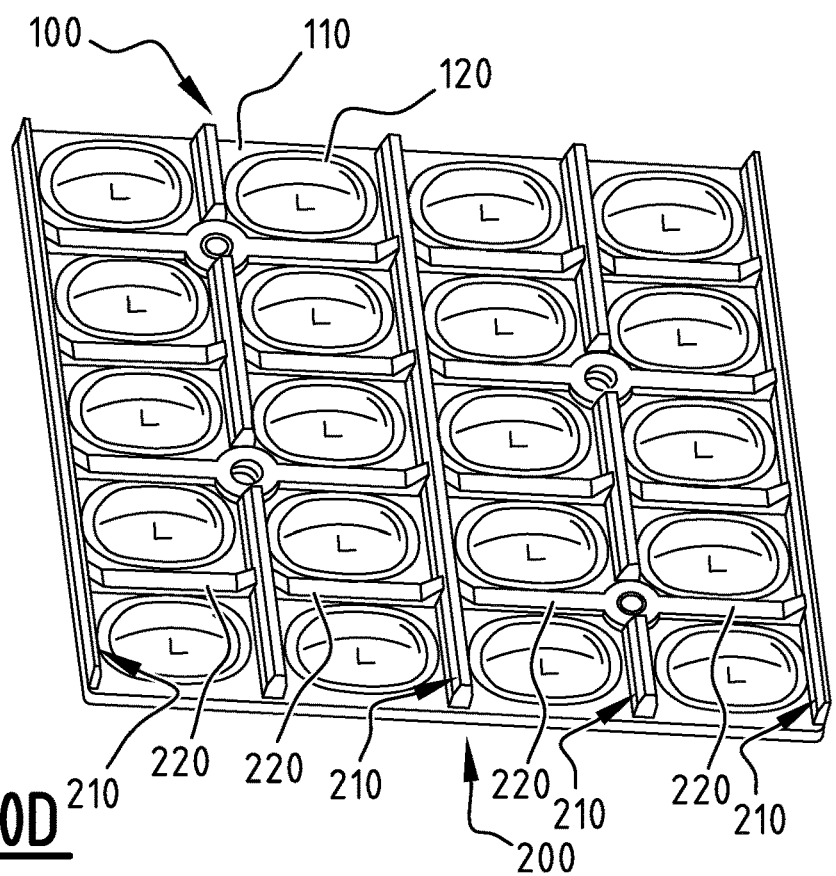

FIG. 8 shows a perspective view of another exemplary embodiment of a light shielding structure for use in a light emitting device. FIG. 9 shows a perspective view of yet another exemplary embodiment of a light shielding structure for use in a light emitting device.

In the embodiments of FIGS. 8 and 9, the light shielding structure 200 for use in a light emitting device (not shown) comprises a plurality of reflective barriers 210. The plurality of reflective barriers 210 of FIGS. 8 and 9 may be similar to the plurality of reflective barriers 210 described with respect to FIG. 1.

A base surface 214 of each reflective barrier 210 may be disposed on the upper flat surface of the lens plate (not shown). Each of the reflective barriers 210 may have a height H, measured perpendicular on the carrier (not shown) between the base surface 214 and a top edge 212 of the plurality of reflective barriers 210.

In the embodiments of FIGS. 8 and 9 the height H of the plurality of reflective barriers 210 is substantially larger than a width W of the base surface 214. In the embodiments of FIGS. 8 and 9, the height H of the plurality of reflective barriers 210 may be larger than a height of the plurality of lenses (not shown), preferably larger than 110% of said height. Preferably, the height H of the plurality of reflective barriers 210 is smaller than 10 mm, more preferably smaller than 8 mm, most preferably smaller than 7 mm, or even smaller than 6 mm.

In the embodiments of FIGS. 8 and 9, the light shielding structure 200 comprises fifteen reflective barriers 210. These fifteen reflective barriers 210 further comprise a second reflective inner surface (not shown) opposite the first reflective inner surface (not shown). The first reflective inner surface and the second reflective inner surface of the fifteen reflective barriers 210 are symmetric with respect to a plane P. The light shielding structure 200 further comprises a connecting means 220. The connecting means 220 is composed of eight connecting portions 221, each connecting portion 221 being configured to connect two reflective barriers 210 to two adjacent reflective barriers 210.

In the embodiments of FIGS. 8 and 9, the plurality of reflective barriers 210 and the connecting means 220 are integrally formed. In other embodiments, the plurality of reflective barriers 210 may be formed in one ore more first pieces, and the connecting means 220 may be formed in one ore more second pieces independently from the one ore more first pieces. The light shielding structure 200 may be mounted on the lens plate (not shown) by means of releasable fastening elements. Said releasable fastening elements may comprise any one or more of the following elements: screws, locks, clamps, clips, or a combination thereof. For example, screws may extend through holes in the light shielding structure 200 and through corresponding holes in the lens plate. The releasable fastening elements may be located at intersections I of the plurality of reflective barriers 210 with the connecting means 220. It should be noted that the height H of the plurality of reflective barriers 210 may be substantially larger than a height H' of the connecting means 220. In another embodiment, a hole or channel may be arranged in the lens plate, into which the light shielding structure may be clipped or slid. In yet another embodiment, the light shielding structure may be integrally formed with the lens plate.

In the embodiment of FIG. 9, the light shielding structure 200 comprises five further reflective barriers 210' arranged at an angle with respect to the base surface 214 and substantially perpendicular to the fifteen reflective barriers 210. In other embodiments, the further reflective barriers 210' may be arranged substantially perpendicular to the base surface 214. In yet other embodiments, the further reflective barriers 210' may be arranged at an angle with respect to the reflective barriers 210. More generally, a plurality of reflective barriers 210 and a plurality of further reflective barriers 210' arranged at an angle with respect to said plurality of reflective barriers 210 may form a two-dimensional array of reflective barriers 210, 210' that cooperates with the two-dimensional array formed by the plurality of rows and columns of lenses. The two-dimensional array of reflective barriers 210, 210' may comprise at least two parallel reflective barriers 210 and at least two parallel further reflective barriers 210' arranged at an angle with respect to the at least two parallel reflective barriers 210. A pattern created by said two-dimensional array of reflective barriers 210, 210' may be composed of at least one square or rectangle if the at least two parallel further reflective barriers 210' are arranged perpendicular to the at least two parallel reflective barriers 210, or may be composed of at least one lozenge or parallelogram otherwise.

In the embodiment of FIG. 9, the five further reflective barriers 210' are disposed between two adjacent rows R of lenses 120. The five further reflective barriers comprise a first portion 211a' of an outer surface, a second portion 211b' of an outer surface, and a first reflective inner surface 215", wherein the second portion 211b' of the outer surface is located further away from a base surface 214' than the first portion 211a'. The first portion 211a' of the outer surface and the first reflective inner surface 215" of the five further reflective barriers 210' are two inclined flat surfaces. The first portion 211a' of the outer surface and the first reflective inner surface 215" of the five further reflective barriers 210' are not symmetric with respect to a plane P'.

In the embodiment of FIG. 9, the connecting means 220 comprises five elongated carrier slats 230, each comprising an elongated channel 231 for receiving a further reflective barrier of the five further reflective barrier 210'. Each of the five further reflective barriers 210' may be slid into a corresponding elongated channel 231. To that end, the base surface 214' of the five further reflective barriers 210' may be provided with one or more protrusions, e.g. one or more pins and/or ribs, which fit in the associated elongated channel 231. In other embodiments, one or more protrusions, such as pins or ribs, may be provided to the connecting means, said one or more protrusions being configured for cooperating with complementary features of at least one further reflective barrier in order to secure the at least one further reflective barrier to the connecting means.

In another non-illustrated embodiment, one or more recesses, such as one or more holes and/or notches, may be arranged in the light shielding structure, into which the plurality of reflective barriers may be clipped, or vice versa. To that end, the base surface of the plurality of reflective barriers may be provided with one or more protrusions, e.g. one or more pins and/or ribs, which fit in the one or more recesses. For example, the one or more notches may have a V-shape or a U-shape, and the one or more protrusions may have a triangular or a circular shape which respectively fits in the V-shape or in the U-shape of the one or more notches. The one or more recesses may be provided to the connecting means. In addition or alternatively, one or more protrusions, such as pins or ribs, may be provided to the connecting means, said one or more protrusions being configured for cooperating with complementary features of the plurality of reflective barriers in order to secure the plurality of reflective barriers to the connecting means.

FIGS. 10A-10D respectively show a perspective view of four exemplary embodiments of a light emitting device.

As illustrated in FIGS. 10A-10D, the shape and configuration of the plurality of reflective barriers 210 and of the connecting means 220 correspond to the embodiment of FIG. 8. The number of reflective barriers 210 comprised in the light shielding structure 200 varies from one embodiment of FIGS. 10A-10D to another. In the first embodiment, illustrated in FIG. 10A, no reflective barrier 210 is present. In the second embodiment, illustrated in FIG. 10B, five reflective barriers 210 are present. In the third embodiment, illustrated in FIG. 10C, which corresponds to the embodiment illustrated in FIG. 8, fifteen reflective barriers 210 are present. In the fourth embodiment, illustrated in FIG. 10D, twenty-five reflective barriers 210 are present.

Figure 11:
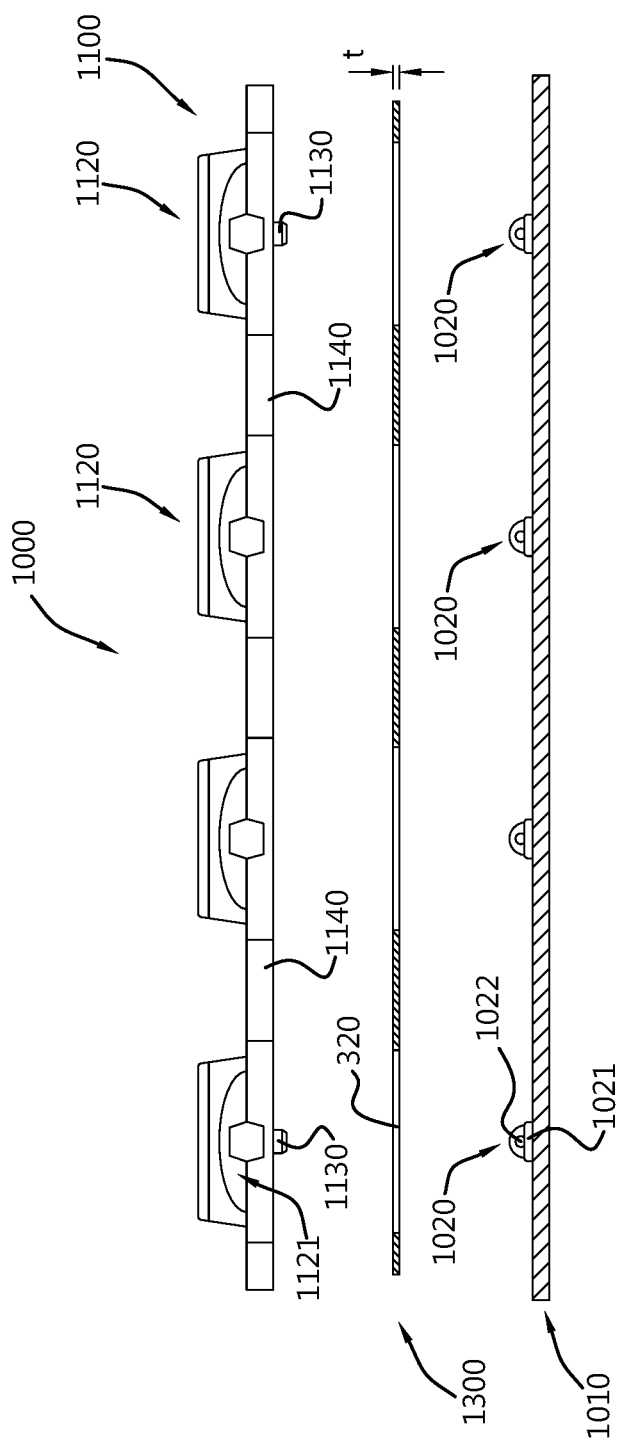
FIGS. 11 and 12 are sectional side views of an exemplary embodiment of a light emitting device in a disassembled and assembled state, respectively.
Figure 12:
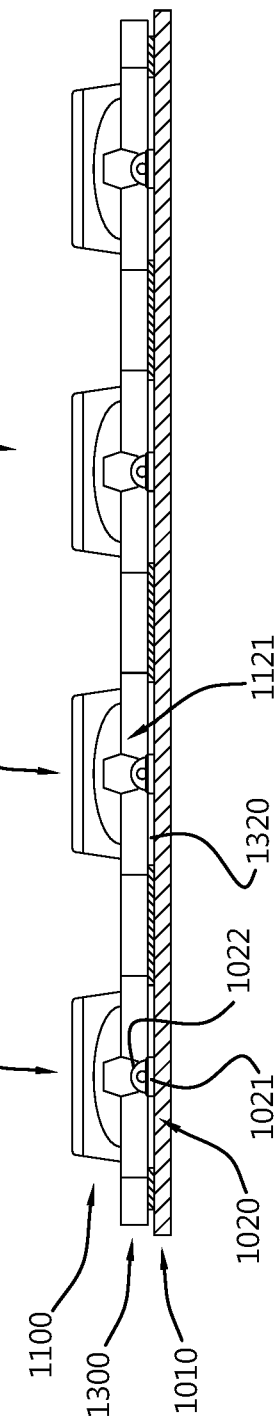
Figure 16:
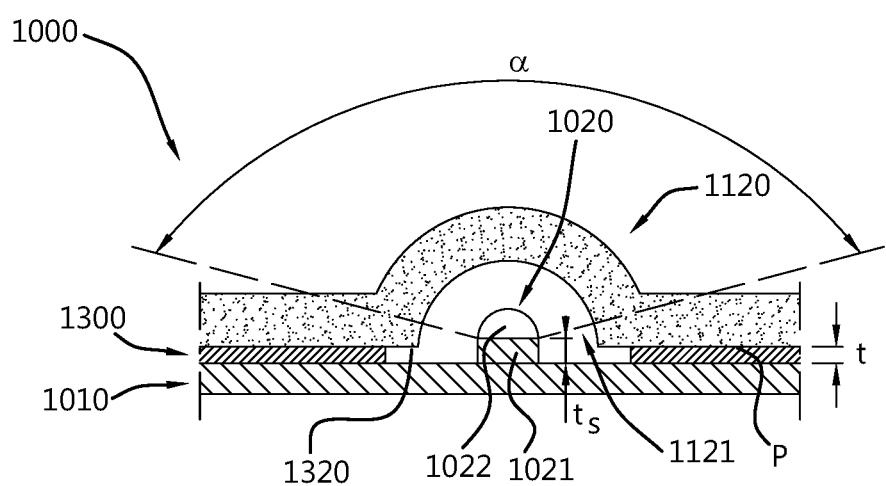
FIG. 16 is a cross-sectional view illustrating various dimensions of an exemplary embodiment of a light emitting device.

FIGS. 11, 12 and 16 illustrate a first embodiment of a light emitting device 1000 comprising a carrier 1010, a plurality of light sources 1020 disposed on the carrier 1010, a spacer layer 1300 disposed on the carrier 1010, and a plurality of optical elements 1120 disposed on the spacer layer 1300. The spacer layer 1300 is provided with a plurality of holes 1320 through which the plurality of light sources 1020 extends. The plurality of optical elements 1120 covers the plurality of light sources 1020. Preferably, the plurality of optical elements 1120 is a plurality of lens elements. More preferably, the plurality of lens elements 1120 is a plurality of free-form lenses having a symmetry plane perpendicular on the carrier 1010. Preferably, the plurality of optical elements 1120, e.g. lens elements, is disposed on the spacer layer 1300 and is in contact with the spacer layer 1300. For example, the optical elements can be included in one or more optical plates that can be disposed directly on the spacer layer 1300.

The light emitting device 1000 with spacer layer 1300 results in a robust and cost-effective device with a good G/G* classification. Moreover, it is also possible to easily achieve various G/G* classifications for the same plurality of optical elements 1120, e.g. by varying the thickness t of the spacer layer 1300. Indeed, the thickness of the spacer layer 1300 can be adjusted in function of the desired correction of the light distribution. Indeed, the amount of light rays at large angles can be reduced by increasing the thickness of the spacer layer 1300 as this will cause a larger distance between the light sources 1020 and the lens elements 1120.

Preferably, the spacer layer 1300 has a thickness t larger than 0.1 mm, preferably larger than 0.3 mm, more preferably between 0.3 mm and 1 mm Such thickness t works well for typical light sources 1020 in outdoor luminaires. As illustrated in FIGS. 11, 12 and 16, preferably, a light source 1020 of the plurality of light sources 1020 comprises a light emitting diode 1022. More preferably, the light source 1020 comprises a substrate 1021 on which the light emitting diode is arranged. In such an embodiment, preferably the spacer layer 1300 has a thickness t which is smaller than the thickness ts of the substrate 1021. This will be particularly advantageous when the light source 1020 has a light emission range α of 180°. When the light emission range α is smaller than 180°, the thickness t may also be slightly larger than the thickness ts of the substrate. The thickness t may be chosen such that it is avoided that light rays from a light source 1020 directly reach the spacer layer 1300.

In the embodiment of FIGS. 11 and 12, the spacer layer 1300 is formed by one separate spacer plate disposed on the carrier 1010. Such spacer plate may be manufactured from a plastic material and can be implemented in existing luminaires without significant modifications to the manufacturing/assembling process of the luminaire.

As illustrated in FIGS. 11, 12 and 16, the lens element 1120 has an internal cavity 1121 facing a corresponding light source 1020. Preferably, in a contact plane P between the spacer layer 1300 and the lens element 1120, a circumferential edge of a hole 1320 surrounds the light source 1020 and a periphery of the internal cavity 1121. In that manner, any light rays directly reaching the spacer layer 1300 (before reaching the lens element 1120) can be reduced or avoided.

Preferably, the spacer layer 1300 is made of a transparent or translucent material. In that manner, light rays can enter the spacer layer 1300, e.g. after reflection at an interface of the optical elements 1120, and can be reflected by the carrier 1010 in a substantially similar way as if the spacer layer 1300 would not have been present. Alternatively, the spacer layer 1300 is made of a reflective material. In that manner, any light rays directed to the spacer layer 1300, e.g. due to reflection at an interface of the optical elements 1120, can be reflected by the spacer layer 1300, e.g. in a substantially similar way as if they would have been reflected by the carrier 1010.

The carrier 1010 may be a printed circuit board. The plurality of light sources 1020 can then be arranged and electrically connected in a known manner to the PCB 1010, wherein the plurality of light sources 1020 will typically comprise a plurality of light emitting diodes 1022 arranged on a substrate 1021.

As illustrated in FIGS. 11 and 12, the plurality of optical elements 1120 may be an integral part of an optical plate 1100, typically a lens plate. The optical plate 1100 may be provided at a side facing the spacer layer 1300 with positioning elements 1130 intended to extend through positioning holes (not shown in FIGS. 11 and 12) in the spacer layer 1300 and to be located in corresponding recesses in the carrier 1010. Further, the optical plate 1100 may be provided with through-holes 1140 for screws or other fixation means, and the spacer layer 1300 may be provided with corresponding through-holes (not shown in FIGS. 11 and 12). In that manner, the optical plate 1100 can be fixed to the carrier 1010 by one or more screws or rivets extending through the spacer layer 1300 into the carrier 1010. Optionally, the one or more screws may extend through the carrier 1010 into a body of a luminaire head.

Figure 13:
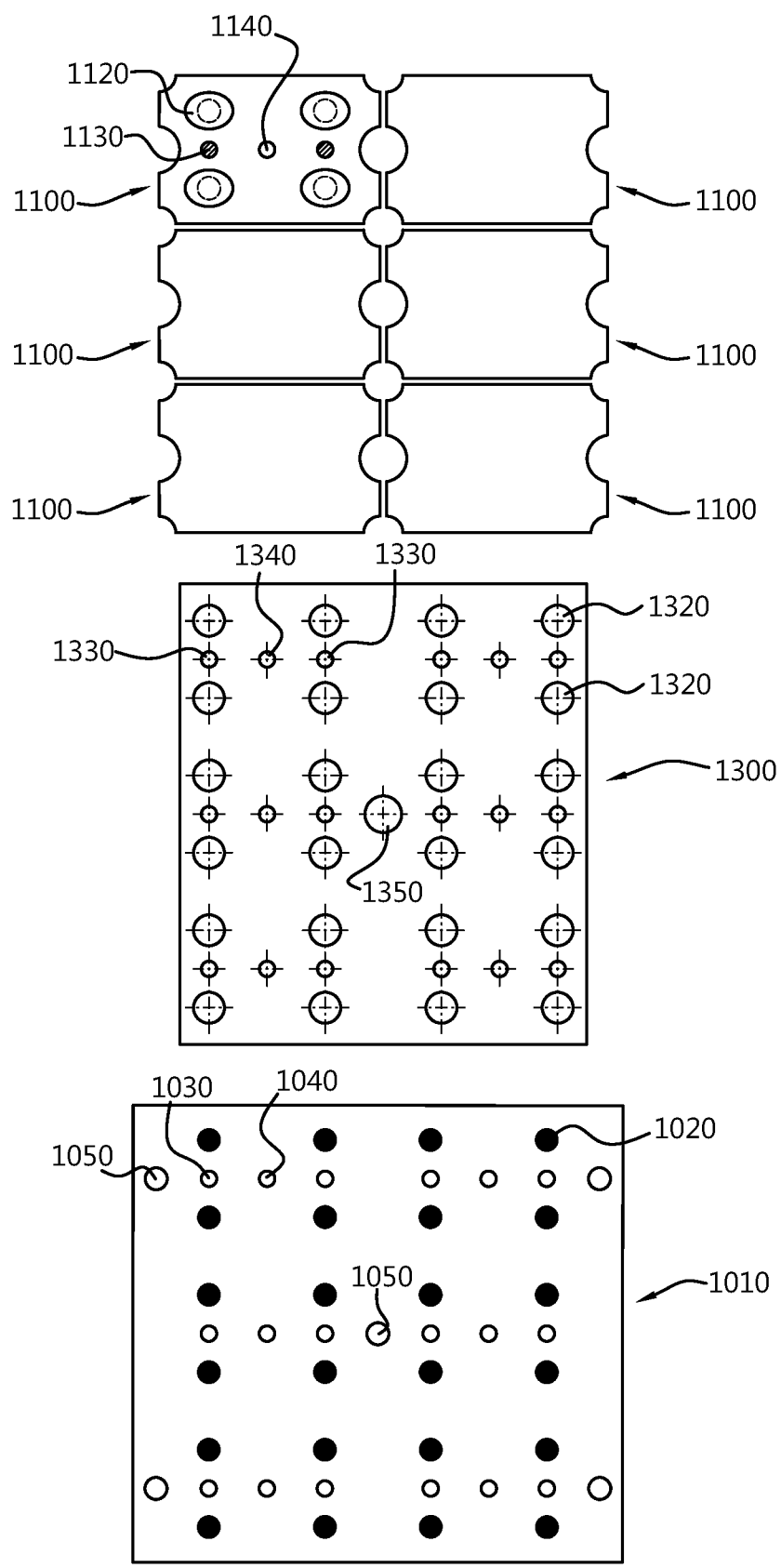
FIG. 13 is a top view of the various components of an exemplary embodiment of a light emitting device.

FIG. 13 illustrates another exemplary embodiment and the same reference numerals have been used to refer to the similar components of the light emitting device. The light emitting device of FIG. 13 is similar to the light emitting device of FIGS. 11 and 12, with this difference that the lens elements 1120 are included in six lens plates. Four lens elements 1120 are shown in one of the lens plates 1100, but the skilled person understands that more or less lens elements can be present in a lens plate and that the other lens plates 1100 may be the same or different.

As illustrated in FIG. 13, preferably, the plurality of light sources 1020, the plurality of holes 1320 and the plurality of optical elements 1120 are arranged according to an array comprising at least two rows and at least two columns. The lens plates 1100 may be provided at a side facing the spacer plate 1300 with positioning elements 1130 intended to extend through positioning holes 1330 in the spacer plate 1300 and to be located in corresponding recesses 1030 in the carrier 1010. Further, the optical plate 1100 may be provided with through-holes 1140 for screws or other fixation means, and the spacer layer 1300 may be provided with corresponding through-holes 1340, 1350. In that manner, the optical plate 1100 can be fixed to the carrier 1010 by one or more screws or rivets extending through the spacer layer 1300 into the carrier 1010. Optionally, the one or more screws may extend through the carrier 1010, see e.g. central hole 1050, into a body of a luminaire head.

Figure 14:
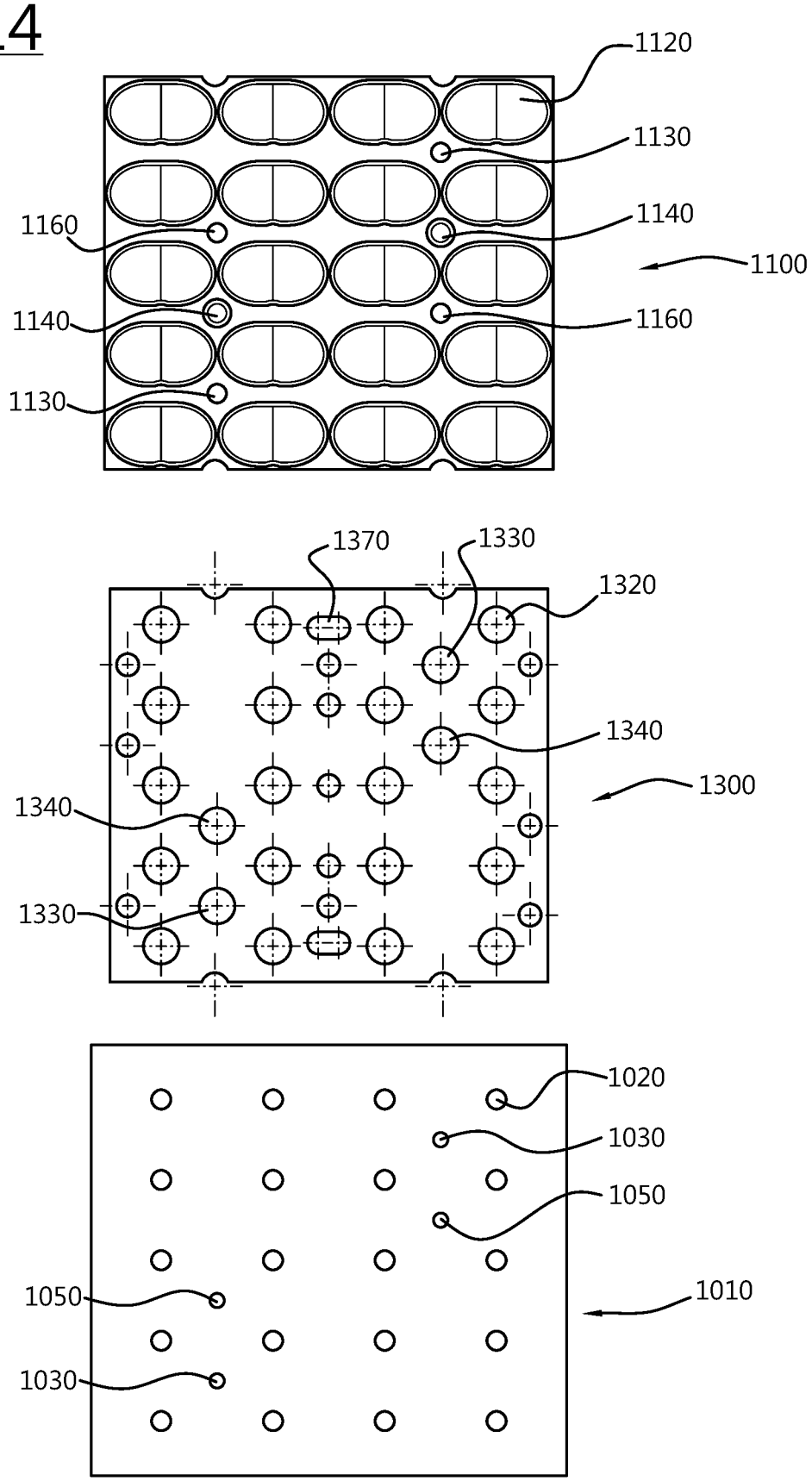
FIG. 14 is a top view of the various components of another exemplary embodiment of a light emitting device.

FIG. 14 illustrates another exemplary embodiment and the same reference numerals have been used to refer to the similar components of the light emitting device. The light emitting device of FIG. 14 is similar to the light emitting device of FIG. 13, with this difference that the lens elements 1120 are included in one lens plate 1100.

As illustrated in FIG. 14, preferably, the plurality of light sources 1020, the plurality of holes 1320 and the plurality of optical elements 1120 are arranged according to an array comprising at least two rows and at least two columns. The lens plate 1100 may be provided at a side facing the spacer plate 1300 with positioning elements 1130 intended to extend through positioning holes 1330 in the spacer plate 1300 and to be located in corresponding recesses 1030 in the carrier 1010. Further, the optical plate 1100 may be provided with through-holes 1140 for screws or other fixation means, and the spacer plate 1300 may be provided with corresponding through-holes 1340. In that manner, the optical plate 1100 can be fixed to the carrier 1010 by one or more screws or rivets extending through the spacer plate 1300 into the carrier 1010. Optionally, the one or more screws may extend through the carrier 1010, see the holes 1050, into a body of a luminaire head. The spacer plate 1300 may be provided with further holes 1370 providing room for components on the carrier 1010. Also, the lens plate 1100 may be provided with holes 1160 or other means to allow for the positioning thereon of other optical elements such as a light shielding structure.

Figure 15:
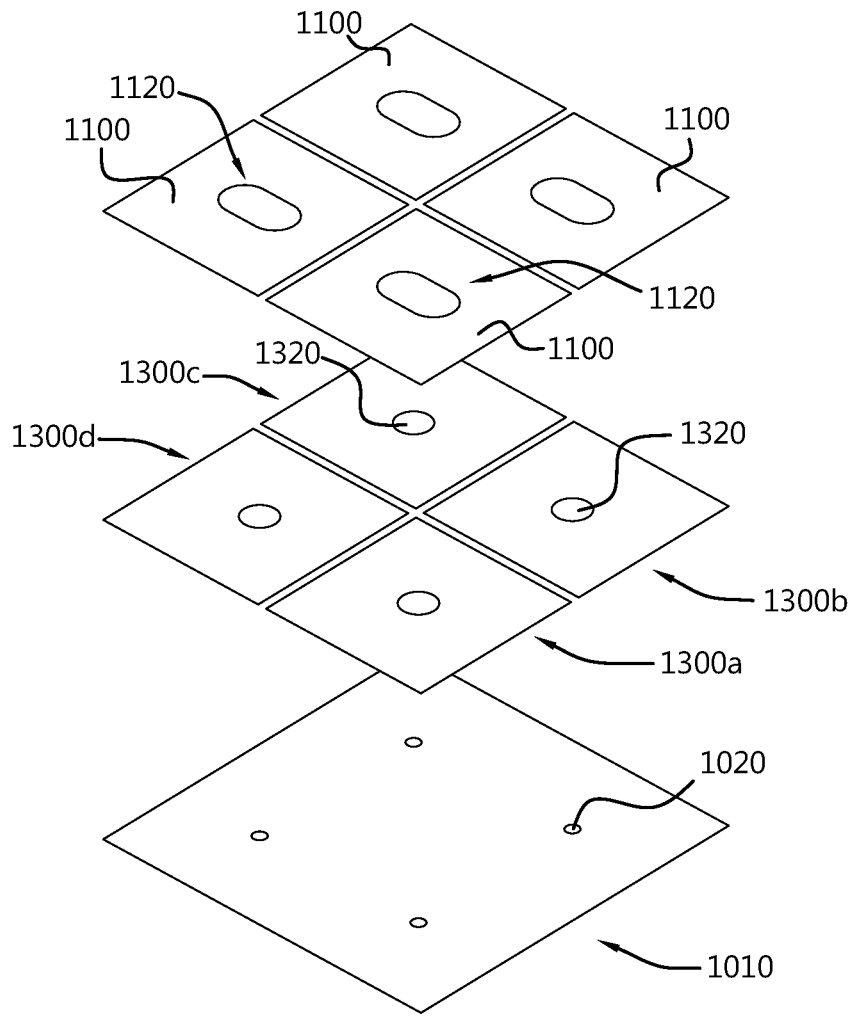
FIG. 15 is a schematic perspective view of another exemplary embodiment of a light emitting device in a disassembled state.

FIG. 15 illustrates yet another exemplary embodiment and the same reference numerals have been used to refer to the similar components of the light emitting device. The light emitting device of FIG. 15 is similar to the light emitting device of FIG. 13, with this difference that each lens plate 1100 comprises a single lens element 1120 and that four spacer plates 1300a, 1300b, 1300c, 1300d form the spacer layer 1300. Each spacer plate 1300a, 1300b, 1300c, 1300d is provided with a hole 1320 for a light source 1020. In FIG. 15 the spacer plates 1300a, 1300b, 1300c, 1300d are arranged next to each other in a plane, but it will be understood that spacer plates may also be stacked.

Whilst the principles of the invention have been set out above in connection with specific embodiments, it is to be understood that this description is merely made by way of example and not as a limitation of the scope of protection which is determined by the appended claims.

The invention claimed is:

1. A light emitting device comprising:
a carrier;
a plurality of light sources disposed on the carrier;
a plurality of lenses disposed on the carrier and covering the plurality of light sources, wherein each lens of the plurality of lenses comprises a lens portion and a base portion surrounding said lens portion; and
a light shielding structure comprising a plurality of reflective barriers, each having an outer surface and a first reflective inner surface, wherein a light transmitting material extends between the outer surface and the first reflective inner surface, said outer surface being oriented such that a portion of the light rays emitted by a first light source of the plurality of light sources is transmitted through a first lens of the plurality of lenses and through a first portion of said outer surface in the direction of the first reflective inner surface,
wherein said first reflective inner surface is configured for reflecting said portion of the light rays in the direction of a second portion of said outer surface, said second portion being located further away from the base portion of the first lens than the first portion, and
wherein, seen in a plane parallel to the carrier, the first lens of the plurality of lenses has a first dimension in a direction substantially parallel to the plurality of reflective barriers, and a second dimension perpendicular on said first dimension, and wherein said second dimension is larger than said first dimension.

2. The light emitting device according to claim 1, wherein the outer surface is arranged and configured such that said portion of light rays which is incident on the first portion of the outer surface has an incident angle $\alpha 1$ with respect to an axis substantially perpendicular to the carrier, said incident angle $\alpha 1$ being a value between a first predetermined angle $\alpha p1$ and 90°, and wherein the first predetermined angle $\alpha p1$ is comprised between 60° and 85°, preferably between 70° and 80°.

3. The light emitting device according to claim 1, wherein the outer surface and the first reflective inner surface are arranged and configured such that said portion of light rays emerging from the second portion of the outer surface has an emergent angle $\beta 1$ with respect to an axis substantially perpendicular to the carrier, said emergent angle $\beta 1$ being smaller than 60°, preferably being comprised between 0° and 50°, more preferably between 0° and 45°.

4. The light emitting device according to claim 1, wherein a first slope angle between a tangent line of the first portion of the outer surface and a plane parallel to the carrier is higher than a second slope angle between a tangent line of the first reflective inner surface and a plane parallel to the carrier.

5. The light emitting device according to claim 1, wherein the first lens of the plurality of lenses has a symmetry plane perpendicular on the carrier, and the plurality of reflective barriers are substantially parallel to said symmetry plane.

6. The light emitting device according to claim 1, wherein a reflective barrier of the plurality of reflective barriers further has a second reflective inner surface, wherein a light transmitting material extends between the outer surface and the second reflective inner surface, said outer surface being oriented such that a portion of the light rays emitted by a second light source of the plurality of light sources is transmitted through a second lens of the plurality of lenses and through the first portion of said outer surface in the direction of the second reflective inner surface,
wherein said second reflective inner surface is configured for reflecting said portion of the light rays in the direction of the second portion of said outer surface, and,
optionally, wherein the reflective barrier is symmetric and is arranged between the first and second lenses at an equal distance thereof.

7. The light emitting device according to claim 6, wherein the plurality of lenses is aligned into a plurality of rows and a plurality of columns to form a two-dimensional array, wherein the plurality of reflective barriers is disposed between adjacent columns of the plurality of columns, wherein the outer surface is facing one or more associated first lenses of the plurality of lenses belonging to a first column of said plurality of columns, wherein one or more associated second lenses of the plurality of lenses belong to a second column which is adjacent to said first column, and, optionally, wherein said plurality of columns extends substantially parallel to a symmetry plane of a lens of the plurality of lenses.

8. The light emitting device according to claim 1, wherein a height of the plurality of reflective barriers, measured perpendicular on the carrier, is larger than a height of the plurality of lenses, preferably larger than 110% of a height of the plurality of lenses.

9. The light emitting device according to claim 1, wherein the light shielding structure further comprises a connecting means configured for connecting the plurality of reflective barriers, and, optionally, wherein the connecting means comprises one or more notches or channels into which the plurality of reflective barriers is received, or, wherein the plurality of reflective barriers and the connecting means are integrally formed.

10. The light emitting device according to claim 9, wherein the plurality of lenses is aligned into a plurality of rows and a plurality of columns to form a two-dimensional array, wherein the plurality of reflective barriers is disposed between adjacent columns of the plurality of columns, and wherein the connecting means is disposed between adjacent rows of said plurality of rows.

11. The light emitting device according to claim 9, wherein, in an area between adjacent lenses, a height of the plurality of reflective barriers is substantially larger than a height of the connecting means.

12. The light emitting device according to claim 1, wherein the light shielding structure is made as an integral part of the plurality of lenses.

13. The light emitting device according to claim 1, wherein the light shielding structure is mounted on the plurality of lenses by means of releasable fastening elements, and, optionally, wherein the releasable fastening elements comprise any one or more of the following elements: screws, locks, clamps, clips, or a combination thereof.

14. The light emitting device according to claim 13, wherein the light shielding structure further comprises a connecting means configured for connecting the plurality of reflective barriers, and wherein the releasable fastening elements are located at intersections of the plurality of reflective barriers with the connecting means.

15. The light emitting device according to claim 1, wherein the light shielding structure comprises at least one further reflective barrier arranged at an angle with respect to the plurality of reflective barriers, and,
optionally, wherein the plurality of lenses is aligned into a plurality of rows and a plurality of columns to form a two-dimensional array, wherein the plurality of reflective barriers is disposed between adjacent columns of the plurality of columns, and wherein the at least one further reflective barrier is disposed between two adjacent rows.

16. The light emitting device according to claim 15, wherein the light shielding structure further comprises a connecting means configured for connecting the plurality of reflective barriers, and wherein the connecting means comprises at least one elongated carrier slat, said at least one elongated carrier slat comprising an elongated channel configured for receiving a reflective barrier of the at least one further reflective barrier.

17. A light shielding structure for use in a light emitting device according to claim 1, said light shielding structure comprising a plurality of reflective barriers, each having an outer surface and a reflective inner surface, wherein a light transmitting material extends between the outer surface and the reflective inner surface, said outer surface being oriented such that a portion of the light rays emitted by a first light source of the plurality of light sources is transmitted through a first lens of the plurality of lenses and through a first portion of said outer surface in the direction of the reflective inner surface, wherein the first lens of the plurality of lenses comprises a lens portion and a base portion surrounding said lens portion, wherein said reflective inner surface is configured for reflecting said portion of the light rays in the direction of a second portion of said outer surface, said second portion being located further away from the base portion of the first lens than the first portion.

18. A light emitting device comprising:

a carrier;

a plurality of light sources disposed on the carrier;

a plurality of lenses disposed on the carrier and covering the plurality of light sources, wherein each lens of the plurality of lenses comprises a lens portion and a base portion surrounding said lens portion; and a light shielding structure comprising a plurality of reflective barriers, each having an outer surface and a first reflective inner surface, wherein a light transmitting material extends between the outer surface and the first reflective inner surface, said outer surface being oriented such that a portion of the light rays emitted by a first light source of the plurality of light sources is transmitted through a first lens of the plurality of lenses and through a first portion of said outer surface in the direction of the first reflective inner surface, wherein said first reflective inner surface is configured for reflecting said portion of the light rays in the direction of a second portion of said outer surface, said second portion being located further away from the base portion of the first lens than the first portion, and wherein the light shielding structure further comprises a connecting means configured for connecting the plurality of reflective barriers.

19. A light emitting device comprising:

a carrier;

a plurality of light sources disposed on the carrier;

a plurality of lenses disposed on the carrier and covering the plurality of light sources, wherein each lens of the plurality of lenses comprises a lens portion and a base portion surrounding said lens portion; and a light shielding structure comprising a plurality of reflective barriers, each having an outer surface and a first reflective inner surface, wherein a light transmitting material extends between the outer surface and the first reflective inner surface, said outer surface being oriented such that a portion of the light rays emitted by a first light source of the plurality of light sources is transmitted through a first lens of the plurality of lenses and through a first portion of said outer surface in the direction of the first reflective inner surface, wherein said first reflective inner surface is configured for reflecting said portion of the light rays in the direction of a second portion of said outer surface, said second portion being located further away from the base portion of the first lens than the first portion, and wherein the first lens of the plurality of lenses has a symmetry plane perpendicular on the carrier, and the plurality of reflective barriers are substantially parallel to said symmetry plane.

* * * * *